US008471706B2

(12) United States Patent
Schuster et al.

(10) Patent No.: US 8,471,706 B2
(45) Date of Patent: Jun. 25, 2013

(54) USING A MESH OF RADIO FREQUENCY IDENTIFICATION TAGS FOR TRACKING ENTITIES AT A SITE

(75) Inventors: John Joseph Schuster, Redmond, WA (US); Rand William Lee, Seattle, WA (US); Mark Plett, Kirkland, WA (US)

(73) Assignee: John Schuster, Redmond, WA (US)

( * ) Notice: Subject to any disclaimer, the term of this patent is extended or adjusted under 35 U.S.C. 154(b) by 1279 days.

(21) Appl. No.: 12/205,639

(22) Filed: Sep. 5, 2008

(65) Prior Publication Data

US 2010/0060452 A1 Mar. 11, 2010

(51) Int. Cl.
*G08B 23/00* (2006.01)
*G01S 3/02* (2006.01)

(52) U.S. Cl.
USPC ........................................ 340/572.1; 342/463

(58) Field of Classification Search
USPC ................. 340/572.1, 539.13, 539.21, 573.4, 340/10.1, 10.2, 10.4; 342/463, 457, 465, 342/450
See application file for complete search history.

(56) References Cited

U.S. PATENT DOCUMENTS

| | | | | |
|---|---|---|---|---|
| 6,127,976 A * | 10/2000 | Boyd et al. | .................... | 342/463 |
| 6,380,894 B1 | 4/2002 | Boyd et al. | .................... | 342/450 |
| 6,968,194 B2 | 11/2005 | Aljadeff et al. | ............ | 455/456.1 |
| 6,972,682 B2 | 12/2005 | Lareau et al. | ............. | 340/568.1 |
| 7,034,683 B2 | 4/2006 | Ghazarian | .................. | 340/568.1 |
| 7,256,681 B1 * | 8/2007 | Moody et al. | ................ | 340/10.1 |
| 7,295,115 B2 | 11/2007 | Aljadeff et al. | ............ | 340/572.1 |
| 7,323,989 B2 | 1/2008 | Allen | ......................... | 340/572.1 |
| 7,324,824 B2 * | 1/2008 | Smith et al. | ................. | 455/456.1 |
| 7,916,026 B2 * | 3/2011 | Johnson et al. | ............ | 340/572.1 |
| 8,026,814 B1 * | 9/2011 | Heinze et al. | ............... | 340/572.1 |
| 8,311,558 B2 * | 11/2012 | Davidson et al. | .......... | 455/456.1 |
| 2004/0174260 A1 | 9/2004 | Wagner | ...................... | 340/568.1 |
| 2005/0156711 A1 | 7/2005 | Aljadeff et al. | ............. | 340/10.34 |
| 2005/0207381 A1 | 9/2005 | Aljadeff et al. | ................ | 370/338 |
| 2006/0224306 A1 | 10/2006 | Workman et al. | ............. | 701/207 |
| 2006/0270421 A1 * | 11/2006 | Phillips et al. | ................. | 455/457 |
| 2007/0096876 A1 * | 5/2007 | Bridgelall et al. | ........... | 340/10.1 |
| 2007/0171069 A1 | 7/2007 | Allen | ......................... | 340/572.1 |
| 2007/0222582 A1 | 9/2007 | Fontijn | ....................... | 340/539.1 |
| 2007/0273534 A1 | 11/2007 | McGinn et al. | ............ | 340/572.8 |
| 2010/0309051 A1 * | 12/2010 | Moshfeghi | ..................... | 342/378 |

OTHER PUBLICATIONS

RFID Basics. My Dealer Lot—Tracking & Securing Your Vehicle Assets. http://www.mydearlot.com/basics.html.
IntelliLot™ Features. https://keywhere.net/Solutions.html.
Brightlot™—Real Time Automated Vehicle Location. http://www.brightlot.com/thebrightsolution.html.
AeroScout—Enterprise Visibility Solutions. http://www.aeroscout.com/content.asp?page=SystemOverview.
RFind. http://www.rfind.com/overview.php.

* cited by examiner

*Primary Examiner* — Benjamin C Lee
*Assistant Examiner* — Sigmund Tang
(74) *Attorney, Agent, or Firm* — Lee & Hayes, PLLC

(57) ABSTRACT

A system for tracking entities at a site comprises a mesh of radio frequency identification (RFID) tags. Each of the tracked entities, which may move about the site, is associated with and attached to a portable RFID tag. Each RFID tag is at least periodically caused to transmit a signal that includes an identification of the RFID tag. The signal is received by other RFID tags that are within range, which determine a location indicative parameter. Some of the RFID tags receiving the signal are fixed at predefined locations. Specific fixed RFID tags are designated as controller nodes. Data comprising an identification of the RFID tag receiving a signal, the location indicative parameter, and the identification of the portable RFID tag transmitting the signal are communicated to a location engine server, which processes the data to determine at least a relative position of the portable RFID tags on the site.

34 Claims, 10 Drawing Sheets

USING A MESH OF RADIO FREQUENCY IDENTIFICATION TAGS FOR TRACKING ENTITIES AT A SITE

BACKGROUND

It is often important to track or monitor at least the general location of entities at a work site or other type of environment. The entities that might be tracked at a site can be objects and/or personnel. For example, automobile dealerships frequently misplace vehicles and keys, and the size of some of these dealerships makes it difficult to determine where specific personnel are located. The constant problems associated with finding vehicles on a lot, and the keys necessary to operate them, as well as determining whether specific salespersons are at the facility and their location wastes time and reduces revenues, profits, and often adversely impacts customer satisfaction.

A salesperson at an automobile dealership may inadvertently put the keys to a car that is on the sales lot in a pocket and leave the site, perhaps on a test drive with another customer, or to go home. When another salesperson tries to find the keys on a peg board or some other designated repository for the vehicle keys, he finds that they are missing, and it is not evident who may have taken them or where they can be found. Furthermore, a customer may drop off a car for repair and upon returning to pickup the car, find that the repair shop is not sure where the car has been temporarily parked after being repaired, or the service manager may not be able to readily determine where the keys to the customer's vehicle have been placed. Clearly, the time required to resolve these matters relating to missing or misplaced entities reduces efficiency and may lead to lost sales or dissatisfied customers.

This problem is not limited to automotive dealerships. Nor are the entities that may need to be tracked limited to salespeople, vehicle keys, and vehicles. However, the following discussion is primarily directed to that specific type of business, since a solution to the problem of tracking the general location of personnel, vehicles, and vehicle keys is generally applicable to other types of applications and businesses.

At least in regard to preventing loss of keys for vehicles at a dealership, one approach that has been developed employs an electronic lockbox to hold the key for a vehicle. The lockbox hangs on the outside of a window on the vehicle, held in place when the window is rolled up. A salesperson or other individual that needs to access the key for a vehicle inserts an identification card into a slot on the lockbox and enters a personal identification number (PIN). If authorized, the lockbox opens, to enable the vehicle key to be accessed. Data are retained indicating the date, time, person accessing the key, and other information of interest in tracking the use of the vehicle for customer test drives, etc. The data are provided to a central monitoring station that can produce reports related to the vehicle activity. While this approach ensures that the person accessing the key for a vehicle is identified, in the event that the key is not returned to the lockbox after a use of the vehicle for a test drive or other purpose, the lockbox approach does not determine the relative position of each vehicle on the lot and cannot track the nominal position of personnel at the site. Also, the lockbox cannot determine if the vehicle key was transferred to another person at the site, which can make it difficult to locate a key that has been handed off to another salesperson. In addition, the lockbox solution poses a security risk, because the storage of keys with a vehicle makes theft potentially easier.

Another approach has been developed that uses radio frequency identification (RFID) tags that are temporarily mounted on each of the vehicles in a dealer's inventory. Infrastructure units, which communicate with the vehicle mounted RFID tags, are permanently mounted at various positions around the dealer lot, e.g., on lighting poles and are coupled to a central server. The server monitors signals from the RFID tags to determine the location of each vehicle on the lot, which is displayed in a webpage within a browser program on a computer display. There is no provision in this prior art system for tracking personnel, keys, or other types of entities besides vehicles. Also, it appears that the RFID tags on vehicles only communicate with the infrastructure units on the light poles, which can limit the effectiveness of the system for locating a vehicle that is at a remote corner of the lot, at some distance from the nearest permanently mounted infrastructure unit.

Yet another prior art system employs what is referred to as a "real time" location system that includes tags attached to vehicles that transmit a Wi-Fi signal to fixed Wi-Fi receivers, which is the equivalent of using Wi-Fi as a form of RFID, rather than to more typical RFID readers. This system employs a "time distance of arrival" triangulation approach to determine the location of a vehicle based on the slight differences in time required for a Wi-Fi signal transmitted from the tag on a vehicle to arrive at different Wi-Fi receivers mounted at various locations on a dealer's lot. The receivers are powered either directly (e.g., by batteries, or by AC line power), or by power-over-Ethernet conveyed through an Ethernet communication link, or by solar cells that can recharge a battery in the receiver. The Ethernet links convey the received signal times to a central server that determines the location of vehicles on a lot. There is again no provision for tracking other types of entities, such as keys or dealer personnel with this system and it requires that a substantial number of permanently fixed Wi-Fi receivers be mounted around the dealer lot to determine a vehicle location with a desired accuracy.

Another prior art system can identify automobiles that are driven in to a service lane by a customer seeking service on the vehicle. This system uses passive RFID tags that are permanently affixed to the customer's vehicle when it is sold to the customer or when the customer initially brings the vehicle in for servicing. The system detects the specific vehicle and displays a welcome to the customer on a flat panel display; however, this system does not track the location of the vehicle after it leaves the service lane.

Clearly, there are functions that each of the prior art systems do not provide and potential issues that can arise in regard to the limited functions that they do provide. It would thus be desirable to develop a system and procedure for tracking a plurality of different types of entities at a site that makes use of a network of interactive RFID tags that are each associated with a different entity. Each RFID tag should be able to periodically transmit a signal to other of the RFID tags that enables the general location of the entity with which it is associated to be determined. If a specific type of entity is in motion, the signal should be transmitted more frequently, to enable tracking of the entity as it moves about on the site, enters the site, or leaves the site.

SUMMARY

To address the problems discussed above, a system has been developed that uses small, active RFID tags to track the relative physical location of a plurality of different types of entities at a site, where each entity is associated with a specific RFID tag. In regard to an exemplary application of this system to an automotive dealership, vehicles, keys, and employees can be tracked by the system anywhere within the dealership. A real time location system (RTLS) of this type can save a typical dealership thousands of dollars a month in replacement key expenses and wasted labor. More difficult to quantify, but still of very significant value, are the additional sales that can be made by efficiently finding any misplaced vehicles faster, the reduction in employee stress associated with searching for vehicles and keys, and the potential increase in customer satisfaction, which is frequently critically important to a dealership, to enable it to earn manufacturer bonus money.

Accordingly, an exemplary method has been developed for tracking entities, to determine at least a relative location of the entities at a site. The method includes the step of creating a mesh network at the site that is formed of a plurality of portable RFID tags, and a plurality of fixed RFID tags, all of which transmit and receive radio signals, the portable RFID tags each being associated with a different entity from a plurality of different types of entities that can move around at the site. Each portable RFID tag is physically coupled or attached to the entity with which it is associated. A portable RFID tag that has not moved from a previous known location comprises a static RFID tag. The RFID tags are caused to transmit a signal that conveys an identification of that RFID tag, and the signal is received by any other RFID tag that is disposed within range. The RFID tags that are receiving the signal include one or more RFID tags with established or known positions. When an RFID tag receives the signal being transmitted, it determines a location indicative parameter that is saved in connection with the identification of the RFID tag that transmitted the signal. Data comprising the location indicative parameter and identification of the RFID tag for each of the signals that was received by an RFID tag are forwarded to a processor, along with an identification of the RFID tag that is forwarding the data. By using Collaborative Multi-lateration, the location indicative parameter data from the portable RFID tags and the fixed or static RFID tags in combination with the known positions of the fixed RFID tags, and the identification of the portable and fixed or static RFID tags forwarding the data, and by using the identification of the portable and fixed or static RFID tags originally transmitting signals, at least relative positions of the entities at the site are then determined.

As used herein, the term "location indicative parameter" that is used to determine the relative position of the transmitting RFID tag can refer to one of three different parameters. The first parameter that can be employed for this purpose in the present approach is the received signal strength of the signal transmitted by an RFID tag, which is indicative of the distance between the transmitting RFID tag and the receiving RFID tag. A second parameter that can be used is the "time of flight" of the received signals, i.e., the time required for a signal transmitted from an RFID tag to be received by other RFID tags, since the time of flight also corresponds to a distance between the transmitting RFID tag and the receiving RFID tag. The second parameter would require that all RFID tags be synchronized to a common clock and that the time of transmission be included in the signal transmitted by each RFID tag. The third parameter that can be used to determine the location of the transmitting RFID tag is the "angle of arrival" of the transmitted signal that is received by other RFID tags. To measure the angle of arrival, each receiving RFID tag would likely include a scanned antenna array, which may be prohibitively expensive. An intersection of lines drawn along the different angles of arrival detected by the receiving RFID tags can indicate the position of the transmitting RFID tag relative to the receiving RFID tags.

At least some of the RFID tags that are associated with the entities can include a sensor for detecting when the RFID tags are in motion. The step of repetitively causing each RFID tag that is associated with one of the entities to transmit a signal can then include the step of causing each such RFID tag to continuously (or at least more frequently) transmit a signal identifying the RFID tag that is in motion, enabling that RFID tag to be at least coarsely tracked as the RFID tag is moved about at the site.

The method can also include the step of detecting whether an RFID tag associated with an entity has been removed from the entity. If the RFID tag has been removed, the method provides for including an indication that tampering has occurred when the signal is next transmitted by the RFID tag that is thus affected to a continuously powered infrastructure unit.

One type of entity with which the portable RFID tags are associated can be personnel employed at the site. The method can then include the step of physically attaching the portable RFID tag to an identification badge that is carried by a person while the person is working at the site. The processor can indicate at least a specific portion of the site where the person carrying the identification badge is located by determining the relative location of the portable RFID tag attached to the identification badge.

Other types of entities with which the portable RFID tags are associated can include vehicles at the site, and keys that are used with the vehicles. In this case, the method can include the step of accessing a database storing information identifying each of the vehicles and relating an identification of each of the vehicles to a specific key used with the vehicle. At least the relative location of each of the vehicles and of each of the keys on the site can then be determined by the processor based upon the relative position of the portable RFID tags that are physically coupled to the vehicles and the keys.

A user is able to enter a query to determine where a specific one or more of the entities is located at the site. The processor responds to the query by indicating at least the relative location of the specific one or more entities at the site. Ideally, the processor will accurately locate the position of the entity on a map along with the relative positions of all neighboring entities.

The processor can also use the data forwarded to the processor to determine when any entity is leaving or entering the site and to determine if a plurality of the entities is leaving or entering the site together.

A power supply can be provided for recharging a battery included in each RFID tag, when the RFID tag is electrically coupled to the power supply. The battery can be recharged at times when the entity with which the RFID tag is associated is not moving about the site and the RFID tag can be coupled to the power supply.

At least one of the fixed or static RFID tags can be designated as a controller node that is higher in a relative hierarchy than others of the fixed or static RFID tags. The controller node manages other fixed or static RFID tags and portable RFID tags that are in a designated portion of the site. At least one of the fixed or static RFID tags designated as a controller node can be coupled in communication with the processor for conveying the data received for the designated portion of the site to the processor. The coupling of the controller node to the processor may be either direct or through a data network such as the Ethernet, or the mesh network of RFID tags. The forwarding of RFID network data to the processor will require at least one bridge node that will have a radio interface as well as a data network interface. A bridge node would then be able to relay traffic from the radio network to the processor via a standard data network, such as the Ethernet.

The method can also include the step of preparing a report based upon information related to movement of the plurality of entities at the site, for access by a user. This report can indicate, for example, times at which an entity left the site and returned, a time interval during which an entity has not moved, the theft of an entity from the site, a time interval in which a vehicle has been disposed at a specific portion of the site, the removal of an entity from the site without using another entity that has been checked out of a central storage by an authorized person, the loss of an entity on the site, removal of the RFID tag from the entity with which it is associated, and a charge condition of batteries used to supply power to the RFID tags. Other types of reports can also be produced.

This method can also include the step of determining that a specific entity has been removed from the site that should not have been removed, based upon the data forwarded to the processor. In response to determining that the specific entity has been removed, the method can include the step of carrying out a predefined further step to enable the entity to be returned to the site. For example, if a person has inadvertently removed the specific entity from the site, the predefined further step can include the step of automatically communicating with the person to request that the specific entity be returned to the site.

Another aspect of the present novel technology is directed to a system for tracking entities, to determine at least a relative location of the entities at a site. The system includes components that carry out functions generally consistent with the steps of the method discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a schematic plan view showing a physical layout of an automobile dealership site where an exemplary embodiment of the present is being employed for tracking vehicles, keys used with the vehicles, and personnel who are employed at the site;

FIG. 2 is an elevational view of an exemplary installation on a lighting standard, of a master node having a RFID tag for communicating with portable RFID tags that are attached or coupled to entities at a site such as that shown in FIG. 1, and also showing an optional solar panel that can be used for power to energize the RFID tag and for charging a battery used for energizing the RFID tag when solar radiation is not available (such as during darkness);

DESCRIPTION

Figure 1:
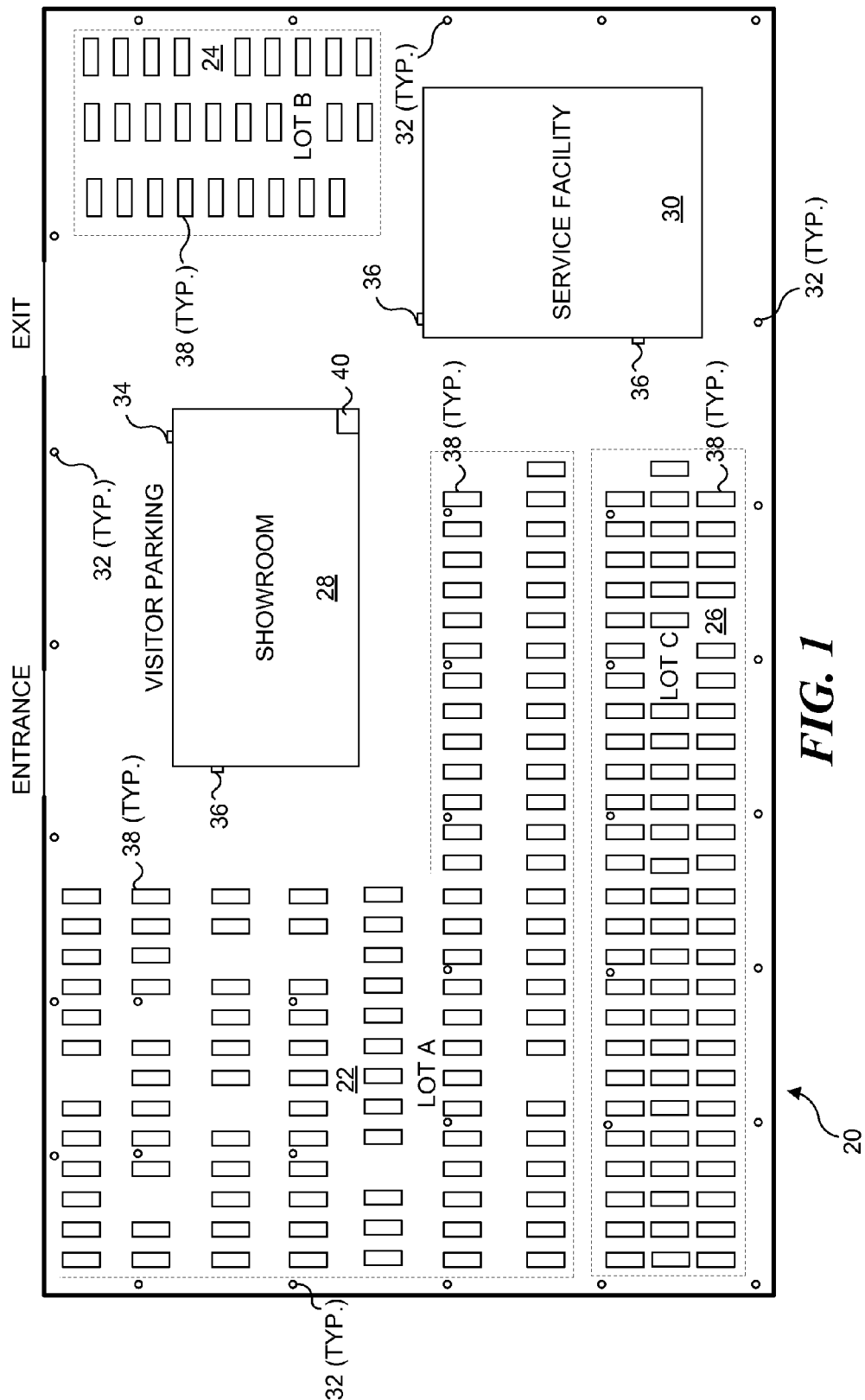

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Entity Tracking System Overview

The following discussion provides an overview of an exemplary embodiment of the novel entity tracking system disclosed herein, which tracks small radio transceiver tags (i.e., active RFID transceiver tags) that are at least temporarily attached to objects such as vehicles, keys, and other assets, and cards that are carried by personnel, to enable the nominal position of each entity to be tracked at an automotive dealer lot, which represents an initial application of this technology. However, it will be appreciated that any type of entity can be tracked with this system, at many other types of sites or facilities, and that the tracking system is thus not limited to use at an automotive sales and/or repair facility. The tracking system is optimized for determining the relative position of the tags rather than their absolute position. In particular, the tracking system has been optimized for monitoring paired tags, which means, for example, that the system will be able to determine if a salesman is carrying a particular set of keys, but is not intended to determine the exact location at the facility where the salesman is standing. However, the tracking system can determine the salesman's approximate location within a building or on the dealer's lot. Further, the system will be able to determine relative positioning information such as that a vehicle A is parked in front of a vehicle B, and to the left of a vehicle C, and that all three vehicles are disposed in the north corner of the main dealer lot. The goal is to communicate the general location where a specific vehicle is parked, while also identifying any vehicles that will need to be moved in order to access the specific vehicle, as well as determining where the keys for each of those vehicles are located.

The entity tracking system determines the nominal position of each tagged item based upon the relative strength of radio signals broadcast from other tagged items and the fixed infrastructure nodes (which can be considered as RFID tags with known or generally fixed locations) disposed proximate to the entity being located. During a coordinated time-slot, each RFID tag and fixed infrastructure node transmits its identity, which is received by any other RFID tags disposed near it, as well as by fixed infrastructure nodes. The time scheduled coordination of these signals is controlled by a location engine server for the site in order to reduce interference and contention. The receiving RFID tags and the fixed infrastructure nodes record the received signal strength from each transmitting RFID tag and fixed infrastructure node. (As noted above, the present novel approach can alternatively use the "time of flight," or the "angle of arrival" of the signals received by other RFID tags as the location indicative parameter used to determine the position of the transmitting RFID tag relative to the infrastructure nodes and other RFID tags receiving the signals, and it is not intended that the present novel approach be in any way limited to the use of the received signal strength in the exemplary embodiment that is described in detail herein. The exemplary embodiment discussed below is lower in cost than the embodiment that uses time of flight, since a synchronized system clock must be maintained on the RFID tags for this approach, and substantially lower in cost than the embodiment that uses angle of arrival to determine the relative position of the transmitting RFID tag, since that approach might use a scanned antenna array at each RFID tag receiving the signal.) Each receiving RFID tag and fixed infrastructure node then forwards a list of tags and fixed nodes that were "heard" and their respective receive power levels to the location engine server, which combines the lists and processes the receive signal strength and other information to determine the relative positions of all of the RFID tags providing input data during that time slot. When RFID tags are communicating with each other and the fixed infrastructure nodes, they are considered to be within a "mesh." A "mesh" update (i.e., "fine mode tracking"), which enables very accurate position determination for each RFID tag, occurs when all of the dealer's vehicle, key, and personnel tags are supplying receive power data to the location engine server. Since transmitting and receiving consumes battery power, a mesh update of the position of every RFID tag only occurs on a scheduled basis, approximately every 15 minutes. Position updates using subsets of tags at different time intervals can be used for tracking only keys and/or only employees, or for monitoring particular areas. However, because RFID tags, such as those carried by personnel or attached to vehicles and keys, will frequently be in motion between mesh updates, reduced accuracy position determination is also available based upon communication between a single RFID tag and the fixed infrastructure nodes that are within range of the single RFID tag, thereby providing "coarse mode tracking" of the single RFID tag.

In order to further conserve battery power, the entity tracking system can adjust the frequency of mesh updates for the time of day. For instance, the system may do a scheduled update every 15 minutes during business hours, but only update every 30 minutes (or at other some other desired time interval) when the dealership is closed. This polling frequency is easily changed by a setting entered in the software for the system that is executed on the location engine server.

A further optimization of polling frequency will occur when a tag is off the lot and out of range of the infrastructure for several scheduled update sessions. When this occurs, the tag will be aware that it is off the lot because it will no longer be receiving acknowledgement transmissions from the system. Consequently, the RFID tag will go into a low power use mode where it will only transmit identification information approximately once every 1-2 hours, in order to extend its battery lifetime. This battery saving mode can be of particular importance to RFID tags that are away from the lot for extended periods such as those mounted to the vehicle and key RFID tags on service loaner cars.

Exemplary Physical Layout of a Site

FIG. 1 illustrates an automobile dealership site 20 at which an exemplary embodiment of the system described herein is installed for tracking entities. The site includes lots 22, 24, and 26, which are also respectively identified as lot A, lot B, and lot C. Lot A might be used for new automobiles that are fully serviced and ready for customers to take out on test drives, lot B might be used for trucks and utility vehicles, while lot C might be used for newly arrived inventory vehicles that are waiting to be introduced onto lot A. The site also includes a showroom 28 in which specific cars may be displayed, on a showroom floor. Also typically included in the showroom building are offices for salespeople, and the manager, as well as administrative offices. A separate service facility 30 can include bays for servicing vehicles as well a parts sales desk.

Disposed at various locations around the site are a variety of fixed RFID tags, including master nodes 32, which in this example, are mounted on lighting standards, as discussed below in connection with FIG. 2. A bridge node 34 is disposed on an exterior of showroom 28, two controller bridge nodes 36 are disposed on the exterior of the service facility building, and one controller bridge node 36 is disposed on the exterior of showroom 28. As will be evident in the example of this Figure, master nodes 32, bridge node 34, and controller bridge nodes 36 all include RFID tags that are fixed in position. The actual position of these fixed nodes on the site is accurately predetermined, for example, using a precision global positioning satellite system (GPS) receiver, although other techniques can instead be employed for this task. These fixed nodes can communicate with any of the portable RFID tags that are in range. An RFID tag 38 is included on each of the vehicles (shown as small rectangles in FIG. 1) that are included in the inventory of the dealer or are temporarily installed in customer vehicles that are being serviced, and on each key used with vehicles at the site. RFID tags are also included on employee badges issued to personnel who work at the site. Both bridge node 34 and controller bridge node 36 can communicate data received directly from the portable RFID tags, or from the master nodes, to a location engine server 40 that is disposed in showroom 28, but could be disposed in an offsite data center if a bridge node is connected to the Internet or to a wireless modem, so that the location engine server can determine at least the relative positions of the entities on the site.

Figure 2:
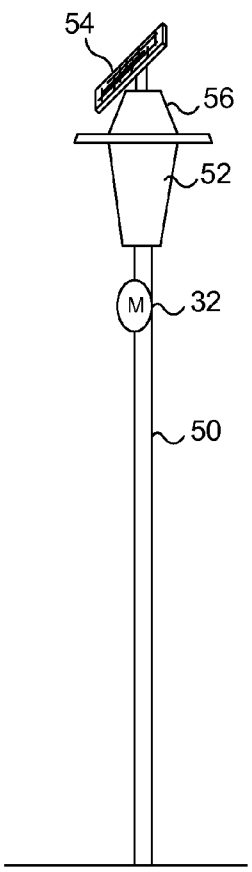

FIG. 2 illustrates details of an exemplary installation of a master node 32 on a lighting pole 50 that was originally installed to support a light fixture 52. Optionally, a solar panel 54 can be mounted on a top cover 56 of the light fixture to supply electrical power to the RFID tag that is included in master node 32 and to charge a battery so that the master node can be energized after the sun goes down or while the site is otherwise relatively dark (e.g., on a foggy or very overcast day).

Figure 3:
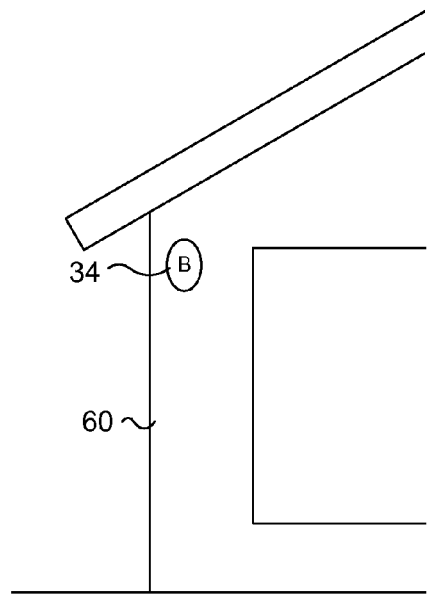
FIG. 3 is a schematic elevational view showing part of the showroom building in FIG. 1 and indicating how a bridge node is mounted to the exterior of the building for communication with master nodes and other RFID tags at the site.

FIG. 3 illustrates part of a building 60, such as a showroom or sales office on a site, illustrating how bridge node 34 is mounted on the exterior surface of the building under the eaves, where it is protected from inclement weather, but can readily be connected into a wired Ethernet local area network system (not separately shown) within the building, to communicate with the location engine server (not shown in this Figure). Alternatively, bridge node 34 can communicate with the location engine server using a wireless communication (via a WiFi system, e.g., one meeting the IEEE 802.11a, b, g, and/or n specifications).

Figure 4:
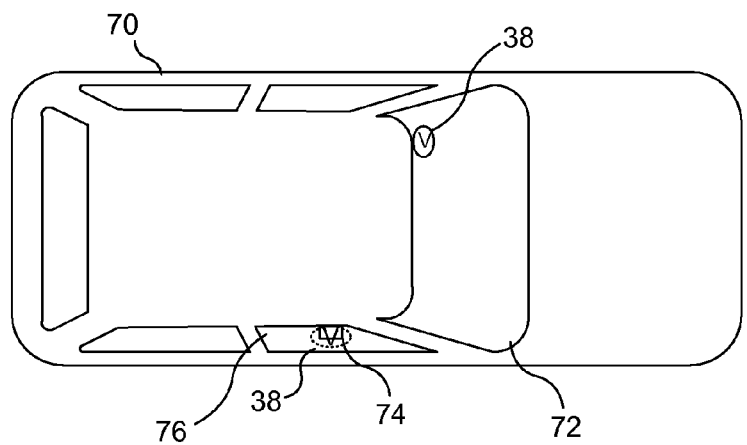
FIG. 4 is a schematic plan view of a vehicle, showing a RFID tag mounted inside on a front windshield, and in an alternative position, suspended by a bracket inside the vehicle, on a side window.

FIG. 4 illustrates how RFID tag 38 can be affixed to the interior surface of a front windshield 72 on a vehicle 70, for example, by using an adhesive. As an alternative, a bracket 74 can be hung over the top of a side window 76, so that the RFID tag is suspended in the interior of the vehicle. The latter approach can be useful in attaching an RFID tag to a customer's vehicle that is being serviced at a dealership repair facility, since the RFID tag will only remain associated with that vehicle for a short time.

Figure 5:
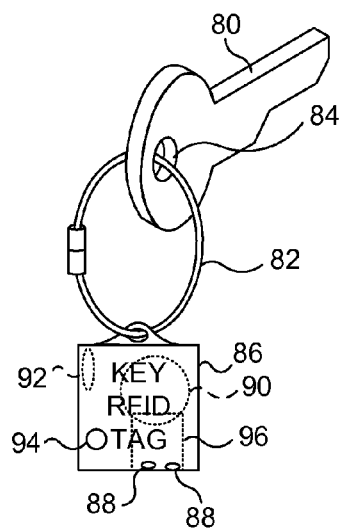
FIG. 5 is an isometric view of a key used for a vehicle, illustrating how a RFID tag is attached to the key by a ring.

In FIG. 5, an exemplary key 80 is illustrated to show how a key ring 82 that passes through an orifice 84 in the key can be used to attach an RFID tag 86. Alternatively, the RFID tag might be adhesively applied to a side of the head of the key (i.e., away from the portion that is inserted into the lock), but the head on some keys may be too small for that approach. An accelerometer 92 (or other type of motion sensor) is included within the RFID tag. RFID tag 86 also includes two contacts 88 that are used to engage terminals of a RFID tag battery charger (not shown) when the key RFID tag is inserted into a slot of the charger. For example, contacts 88 can be included in a USB connector 96 that will enable data communications with the RFID tag without having to use the radio when RFID tag is in the charging station. The charging station can include a master node, which can keep the network informed of the position of the RFID tags in the charging station, while they are charging. A battery 90 within the key RFID tag is thus charged while the key is not being used with a vehicle and can conveniently be left in the charger. A low-battery level indicator 94 is provided on RFID tag 86 and is only activated when the charge on battery 90 drops below a predefined level.

Figure 6:
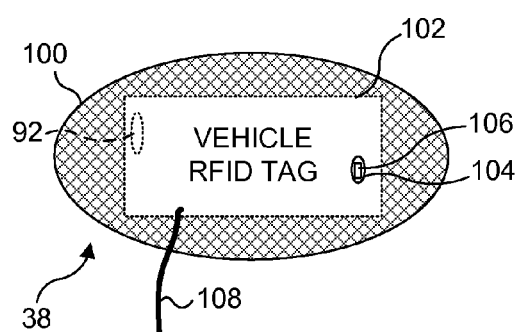
FIG. 6 is a schematic view of an adhesive pad for mounting an RFID tag to a vehicle, illustrating how an anti-tamper switch is provided for detecting if the RFID tag is removed from the window (or other surface) in the vehicle.

Further details of one example for mounting RFID tag 38, which is intended to be associated with a vehicle, are shown in FIG. 6. A vehicle RFID chip 102 is attached to an adhesive patch 100, so that when the patch is applied to a surface, such as the interior surface of a front window in a vehicle, the patch adheres the vehicle RFID chip to the window surface. When thus applied to the window, a button 106 that extends through an orifice 104 is depressed, actuating an anti-tamper switch on RFID chip 102 and changing its state. If the RFID tag is removed from the surface of the window, the state of the anti-tamper switch changes when button 106 is no longer depressed by the surface of the window, which can cause the RFID chip to produce a signal that indicates tampering has occurred.

Figure 7:
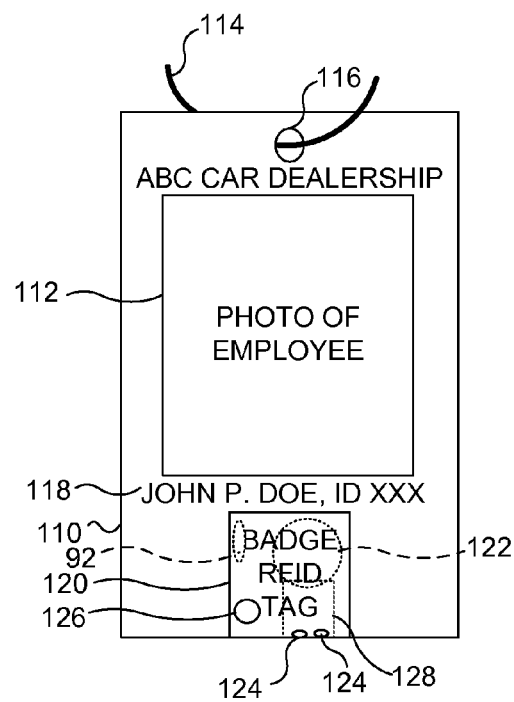
FIG. 7 is a schematic view of a front surface of an exemplary employee badge on which an RFID tag is mounted.

An example of an employee badge 110 is shown in FIG. 7. This example includes a photo 112 of the employee to whom the badge has been issued and is typically carried by the employee or supported around the employee's neck by a cord 114 that passes through an orifice 116 in the employee badge. Also included is a name and identification number 118 for the employee. Adhesively or otherwise secured to the employee badge is an RFID tag 120. An internal battery 122 in the RFID tag can either be periodically replaced or recharged with an electric potential applied to contacts 124, when the badge and RFID tag are inserted into an appropriate slot on a battery charger station (not shown). As noted above, contacts 124 can be included in a USB connector 128 that will enable data communications with the employee badge RFID tag without having to use the radio when RFID tag is in the charging station. The charging station can again include a master node, which can keep the network informed of the position of the employee badge RFID tags in the charging station, while they are charging. A low-battery level indicator 126 (not currently activated) is provided on RFID tag 120 and is only activated when the charge on battery 122 drops below a predefined level.

Tracking System Components

As noted in the above example of FIG. 1, an exemplary embodiment of the entity tracking system includes several different types of RFID tags, fixed infrastructure hardware, including a plurality of the RFID tags used for the fixed infrastructure nodes, and at least one location engine server. In general, all of the types of RFID tags share the same transceiver electronics, but there are differences in the power supply, packaging, and mounting method used for each to physically maintain the RFID tag with or on the entity with which it is associated. The use of common transceiver electronics for the different RFID tags allows for significant manufacturing economies of scale, even when initially, very few customers are involved.

Each RFID tag, regardless of its type, includes a 900 MHz transceiver system on chip, although it should be understood that other frequencies might be used. The transceiver is coupled to a quarter wave whip or chip antenna and is fitted within a protective enclosure, along with a battery power supply, such as batteries 90 (FIG. 5) and 122 (FIG. 7). Each different type of RFID tag is provided with an appropriate mounting system that is included on the enclosure, to physically maintain the RFID tag with the entity with which it is associated. An example of such a mounting system is adhesive patch 100 (FIG. 6).

Since one of the functions of the RFID tag in this exemplary application of the tracking system is to detect when a vehicle is being removed from the site, it is important to prevent someone from removing the RFID tag from a vehicle or its keys. Accordingly, an anti-tamper switch can be provided in vehicle RFID tags and will be monitored by the RFID tag to determine if it has been removed or detached from the entity it is tracking. See, for example, button 106 in FIG. 6. The tamper status of the anti-tamper switch is part of the data that can be reported to the location engine server of the tracking system to create an alarm condition warning personnel at the site that a RFID tag has been removed from the vehicle (or other entity being tracked). However, there will typically be little reason to include this anti-tamper switch on the RFID tags associated with certain types of entities or with RFID tags that are carried by personnel working at the site.

Since operation of the RFID tags that are portable and not fixed requires that they be energized with a battery power supply, each such portable RFID tag can be provided with a low battery indicator light, such as LED 126 (FIG. 7), which can remain unlit until the battery voltage reaches a preset minimum level, and can be caused to flash at a relatively slow rate, to minimize the power consumption of the indicator light.

RFID tags mounted on keys and vehicles or on the employee badges carried by personnel can include accelerometer 92 (FIGS. 5, 6, and 7), which detects the motion of the RFID tag, causing the RFID tag to start broadcasting its identity immediately if the RFID tag and key are moved. The immediate broadcast is important, since a vehicle or key that is attached to the RFID tag may be moving off the site and its change in position might not otherwise be detected if the tracking system only tried to locate it at the next scheduled mesh update of the system. In addition, the accelerometer can be used to put the RFID tag in a low power mode of operation in which it tells the location engine server that it should be considered as fixed until it next reports, which will be triggered by the accelerometer detecting that the RFID tag is in motion.

Vehicle RFID Tags

There are two types of vehicle RFID tags, and they are identical except for the method for mounting each type on a vehicle the enclosure used for the RFID tag (both of which are selected based upon how often the RFID tag will be switched from one vehicle to another), and potentially, the power supply, since different power supplies can be used because of different typical vehicle locations. For example, service vehicle RFID tags may not have solar cells due to the frequent indoor storage of the RFID tags, and the ease of replacing batteries. FIG. 4 illustrates the two exemplary approaches to mounting the RFID tags on a vehicle, as discussed above. Vehicle RFID tags 38 are normally in a quiescent state, which is determined by their software and communications with the location engine server. The purpose of placing the vehicle RFID tag into this quiescent state is to reduce power consumption and thereby extend its battery life. Typically, a vehicle RFID tag will only transmit identity and neighbor RFID tag information every 15 minutes. But, the accelerometer on the RFID tag will produce an output signal when the RFID tag is moved that will cause the RFID tag to continuously (or at least more frequently) broadcast its identification information as long as the RFID tag with its associated vehicle is in motion. Rapid update transmission will end once the RFID tag determines that it has been off the lot for an extended period of time because its broadcasts are not being acknowledged. At that time, it will enter a mode of operation that conserves more power.

Inventory RFID Tags

Inventory RFID tags are intended to be installed on vehicles that will likely be on the dealership's lot for several weeks to months. These tags will be attached to the inside of a vehicle's windshield, typically at the upper left hand corner, in front of the driver's seat, using a rectangular, square, round or elliptical shaped adhesive patch 100 (elliptical shape shown in FIG. 6), which can be made of a type of double-faced tape, for example, Command Strip™ tape marketed by 3M™ Corp. These double-faced adhesive tape strips are ideal for this application because they provide a highly secure attachment, but enable clean and easy removal of an RFID tag that a user wants to remove from a surface, by axially pulling a tab (not shown in FIG. 6) attached to the strip. It is also expected that RFID tags of this type may be used to track other entities that are infrequently moved, such as engine blocks in a dealer's parts department, because of the ease and flexibility of their attachment to such an entity using the double-faced adhesive tape strips.

RFID Tag Power and Other Components

The typical RFID power supply will be a replaceable battery and may use a rechargeable battery, such as battery 90 in key RFID tag 86 shown in FIG. 5, or battery 122 on RFID tag 120, which is shown in FIG. 7. It is expected that even on RFID tags that are frequently in motion and thus, tend to transmit their identification more frequently, consuming more power, the minimum life of the battery before it requires recharging or replacement will be about 90 days. This interval will be substantially longer for other types of RFID tags that only transmit when the scheduled mesh of the network occurs. It is also contemplated that solar charging of the internal battery can be employed for RFID tags used for the fixed infrastructure nodes, if they are not receiving power from an AC line supply or using power over an Ethernet hardwire connection. Solar battery charging may eventually be added to vehicle RFID tags that are affixed to the window of a vehicle where they are exposed to daylight.

RFID tags that include a quarter wave whip or wire antenna 108 (FIG. 6), should be mounted such that the antenna is vertical ±20° when the tag is attached to the windshield or other surface of an entity being tracked. The anti-tamper switch must detect if the tag is removed from the windshield or from any other surface where the RFID tag is attached to an entity being tracked. As discussed above, a micro-switch having button 106 that is used as an actuator, or another suitable switching device that can detect the removal of the RFID tag, can be included on the circuit board that is mounted within the enclosure of the RFID tag so that the button extends through slot or orifice 104 to contact the windshield or other mounting surface, so that the switch contacts are activated when the RFID tag is removed from the windshield or other surface, thereby changing the state of the anti-tamper switch so as to indicate that tampering has occurred.

The RFID tag electronic circuitry used for the transceiver and the enclosure should be suitable for automotive interior environment, including the ambient temperature levels that can occur inside a closed vehicle parked on the dealer lot in the sun on a warm day or in blizzard conditions. The mounting of the RFID tag to the windshield or other surface will be sufficiently secure to avoid dislodgement incurred during normal driving.

Service RFID Tags

Service tags are intended to be installed on vehicles which will only be on the lot for a few days. These RFID tags mount using a window clip, which is designed to slip over a vehicle's side window, as shown in the alternative embodiment of FIG. 4, and enables the RFID tag to be much more readily moved from one vehicle to another than the double-faced adhesive tape strips used on vehicles in the dealer's inventory. The service vehicle RFID tag will be mounted so that it is disposed inside the vehicle where it will be protected from the weather. The components of the RFID tags used for service vehicles will otherwise be identical to those used for vehicles in inventory.

Key RFID Tags

RFID tags can be installed on vehicle keys for new, used, and service vehicles. All key type RFID tags may be identical, or the key type RFID tags to service vehicles can be slightly different due to their much more frequent installation and removal on keys. In particular, it is generally less important to have an anti-tamper switch on the service vehicle key RFID tags, but they may include the anti-tamper switch as an option. All key RFID tags 86 (FIG. 5) are designed to be relatively comfortable when carried in the pocket and to be unobtrusive when the vehicle is being driven. Typically, a key RFID tag will transmit identity and neighboring RFID tag information for signals that have been received more often than a vehicle RFID tag, for example, about every 5 minutes as opposed to at 15 minute intervals, because keys and their RFID tags are more likely to be misplaced. Also the key RFID tags are expected to be returned to a key rack/charging station at the end of every day, so that they will be less battery-power constrained. When a key RFID tag is in the key rack/charging station, its transceiver may be shut off due to it being at a fixed known location. In addition, the key rack/charging station will include a Master Node Fixed RFID tag, which will allow the key rack/charging station communicate which keys are in the key rack/charging station with the location engine server. However, when a key RFID tag is not in the key rack/charging station and is being carried around in a pocket or while in use with a vehicle that is being driven, the tag's on board accelerometer 92 will tell the RFID tag to continuously (or more frequently) broadcast its identification information, thus enabling near continuous coarse mode tracking of its nominal location. This rapid update transmission will occur for several minutes, but will eventually stop if the RFID tag is not receiving acknowledgement from fixed RFID tags thus indicating it has left the dealership. In this case, the RFID tag will only intermittently transmit to conserve battery power. Battery 90 on each key RFID tag 86 should last at least 30 days and will be replaceable, but because the battery can be recharged each time that the key is returned to the key rack/charging station, there will be a preference to use rechargeable batteries for the RFID tags used with keys. To minimize the size of these RFID tags, they will employ chip antennas. To facilitate locating a specific key with its RFID tag, the RFID tag enclosure can be provided with one or more identifying LEDs (where color or LED layout distinguish between different keys or types of key)—not shown in FIG. 5. When queried about the location of a specific key, the location engine server would command the LED on the RIFD tag to flash for several minutes. The flashing LED would enable the key and RFID tag to be easily found in a rack that might potentially include several hundred very similar keys.

Although not shown in the drawings, it will be apparent that a key rack/charging station can be sized to store 100 or more keys and simultaneously charge the batteries on their attached RFID tags. When keys with RFID tags 86 are not being used to drive a vehicle or being carried to and from the vehicle, they should be stored in this central rack/charging station.

There are two alternative embodiments that can be used for the rack that stores these keys. The first embodiment of the rack is relatively simple in design and is intended to store keys with RFID tags having only replaceable batteries, so it does not include a battery charging capability. A simple rack with hooks to hold the keys can be used for this purpose. However, if standard rechargeable batteries are used for the RFID tags on the keys, the batteries may be charged using a stand alone commercial charger that is disposed near the rack, but is not built-into the rack. The master node closest to this rack would be able to command the RFID tags to reduce transmit power to avoid receiver saturation and preserve battery life. The RFID tag would resume full power operation when its accelerometer detected that the RFID tag is in motion.

The second embodiment of a rack is relatively complex and is intended for use with RFID tags having rechargeable batteries. In this embodiment, the rack fully and automatically recharges the batteries in the RFID tags whenever the RFID tag for each of the keys is inserted into a storage slot. The slots include contacts (such as USB connectors) that connect to the circuitry through a mating connector and thus, to the batteries in the RFID tags. This rack embodiment will also include an embedded fixed RFID tag so that it can operate as a master node and thus communicate with the location engine server to indicate which keys are in the rack being charged. This functionality enables the key RFID tags to turn off their transmitters and thereby greatly reduce overall network traffic.

Personnel RFID Tags

The personnel employed at the dealership site can be required to carry identification badges like badge 110, that are also tagged with RFID tags 120 (FIG. 7). The transceiver electronics of the RFID tag will be built into or formed integrally with the identification badge or alternatively, can be worn much like a pager that is independent of the badge or is separately attached to the badge. The system is capable of tracking the exact location of employees, but doing so may raise privacy concerns. Due to this issue, an exemplary embodiment of the RFID tag used with the tracking system will only enable the display with the general location of an employee, i.e., indicate that the employee is located in a specific building or in a specific lot at the site. However, once an employee picks up a key or enters a vehicle, the location of that person will be tracked more specifically—at least showing the relative position of the person in regard to the other RFID tags that are disposed nearby, for example, indicating that the employee is within a vehicle having RFID tag 38 or is carrying a key with RFID tag 86. Typically, personnel RFID tag 110 will transmit its identification and the data that it has received as one or more signals from neighbor RFID tag(s) more often than a vehicle tag, e.g., approximately every 5 minutes rather than at 15-minute intervals. The more frequent transmission schedule for RFID tags 110 can be employed because personnel RFID tags are expected to be returned to a charging station at the end of every work period by the employee and are therefore less battery-power constrained. When a personnel RFID tag is inserted into the charging station, its transceiver may be shut off since it is positioned at a fixed known location while being charged.

As noted above, the RFID tags on the badges carried by personnel need not include an accelerometer. However, as an option, the personnel RFID tags can also be provided with an accelerometer, so that when a personnel RFID tag is not disposed in the charging station and is being carried about by an employee, the RFID tag's on board accelerometer can detect the movement, causing the RFID tag to continuously (or at least more frequently) broadcast its identification information. This alternative can enable a near continuous coarse tracking mode for tracking personnel as they move about a site. The batteries used in the personnel RFID tags should have a minimum life of 60 days if replaceable batteries are used, but rechargeable batteries represent a better cost option for this type of RFID tag, since as explained above, the badges can be stored and recharged when the personnel assigned the RFID tags used on the badge are not onsite. Again, given the size constraints and the desire to provide a badge that can comfortably be carried about by an employee, the antennas used on these types of RFID tags will be of the chip antenna type. The enclosure will be sufficiently robust to enable RFID tags 110 to remain undamaged when being carried about in a pocket, purse, or around an employee's neck on cord 114 (FIG. 7).

Visitor and Vendor RFID Tags

Visitors and dealership vendors can frequently require access to keys and vehicles. In order to monitor unauthorized vehicle use by such individuals, extra personnel tags can be available for use by the visitors and vendors. In particular, it is envisioned that customers may want to go on test drives of vehicles without a salesperson accompanying them. In this circumstance, the customer must be provided with a temporary RFID tag that will authorize them to drive the vehicle off the lot. These visitor and vendor RFID tags are generally of the same configuration as the normal personnel RFID tags 110 used by employees of the dealer.

Personnel RFID Tag Recharging Station

As discussed above, personnel RFID tags 110 can be recharged at a recharging station, or, it may be preferable to provide two recharging stations including one disposed at a reception desk in the sales area and another disposed at the service manager's desk in the vehicle service area. Employees will then likely pick up their badges at the beginning of the day and return them when they leave the dealer site. The system can verify that no keys are paired (i.e., located together) with a specific personnel RFID tag when the personnel RFID tag is placed in the charger, to ensure that the employee who earlier may have picked up a key for a vehicle, which causes the pairing of the key RFID tag with that employee's personnel RFID tag 110 to occur at that point, has subsequently returned the key with its RFID tag 86 to the storage/charger station or given it to someone else, whose ID badge is now paired with the key's RFID tag, and has not left the key in some other place (or retained it in a pocket). If the system detects that a badge with a personnel RFID tag 120 has just been placed in the RFID tag battery charging station, but that the employee assigned that personnel tag had earlier taken a key that has not yet been returned or is now determined to be unaccompanied, the system will provide a visual and/or aural indication of this problem so that the employee can correct the situation and ensure that the key with its RFID tag 86 is returned to the storage/charging station used for storing/recharging key RFID tags before the employee leaves the site. The storage/charging station will also include an embedded fixed RFID tag so that it can operate as a master node and thus communicate with the location engine server to indicate which personnel RFID tags are in the rack. This functionality will enable the personnel RFID tags to turn off their transmitters and thereby greatly reduce overall network traffic.

Infrastructure of the Entity Tracking System

For one exemplary embodiment, the tracking system's infrastructure collects information from the RFID tags, coordinates operation between the various components of the system, and calculates RFID tag positions. In order to simplify installation from both a physical hardware and information technology (IT) standpoint, the entity tracking system has been designed so that it requires virtually no support from existing dealership facilities except for connection to AC power. More specifically, the RFID tag and other components comprising the hardware used for the system provide their own communications network and do not interface with the dealership's existing local area network or other network, except at the server level. An exception to this may occur when a dealership has facilities in multiple locations and wants the entity tracking system to communicate between these multiple geographically disparate locations. In such circumstances, the entity tracking system may be tied into the dealership's local or wide area network to implement communication between the facilities disposed at these different locations.

Location Engine Server

Location engine server 40 (FIG. 1) in this exemplary embodiment is a conventional personal computer (discussed in detail below) that is configured and programmed to collect and process the identification and receive power data from the plurality of RFID tags mounted on entities such as vehicles, keys, and personnel identification badges, and to then calculate the relative positions of the RFID tags. In addition, the location engine server is responsible for establishing the operational protocols, such as timing, of the various fixed nodes in the network, as discussed below. It is expected that location engine server 40 will be installed in the dealership's IT service closet or in some other appropriate space and will be coupled over a conventional local area network to other terminals (not shown) disposed at various desired locations through the site. For example, terminals (which may also be conventional personal computers) may be disposed in the sales showroom, such as on each salesperson's desk, and in the service area, or on a service manager's desk. However, it is possible the location engine server could be installed in an off site data center and connected to the infrastructure at the dealership through a wireless modem that is included in one of the fixed nodes, using the public Internet, over another network connection, or via a dedicated landline connection.

Management Server

Figure 8:
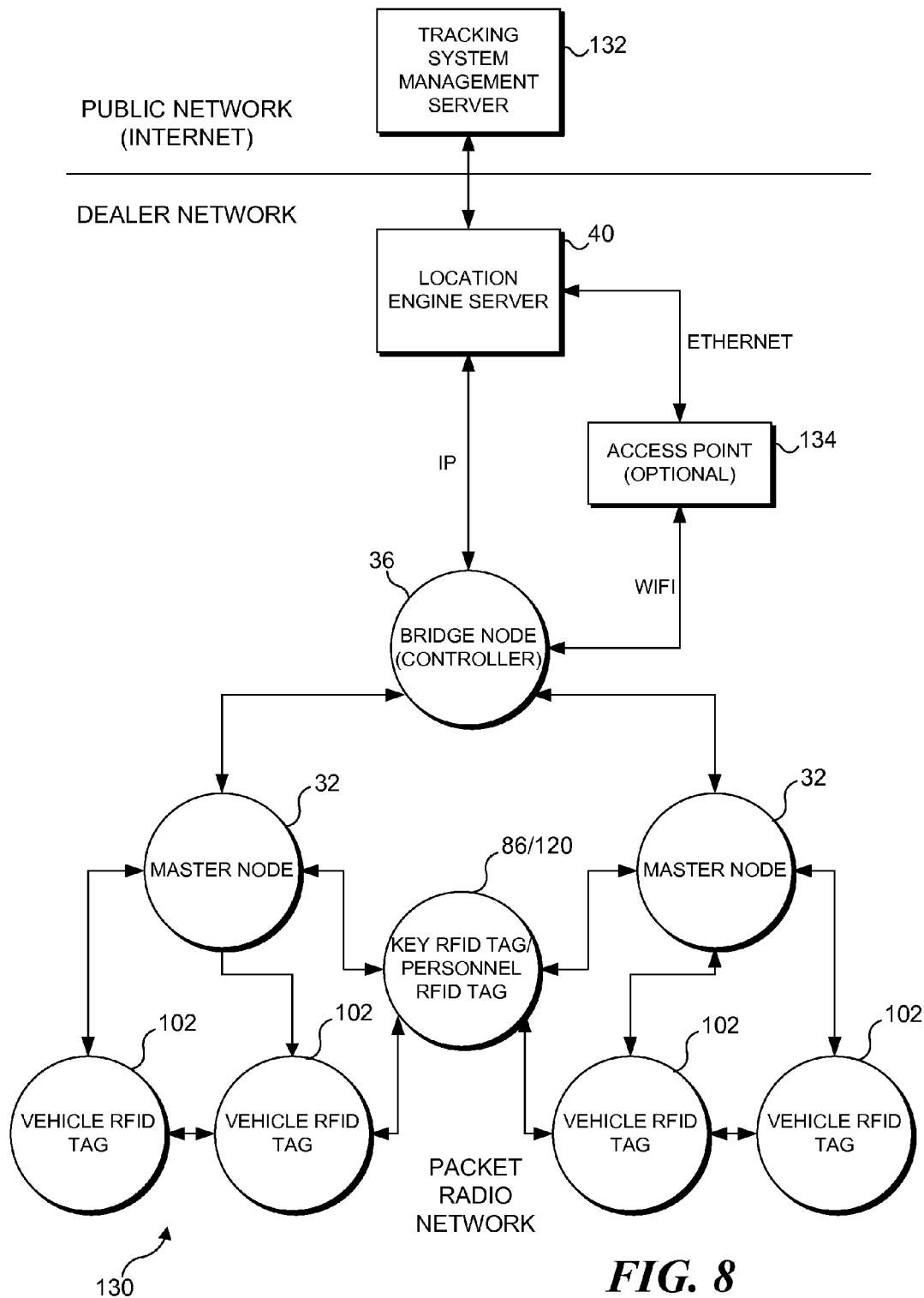
FIG. 8 is a functional view illustrating a portion of an exemplary packet radio network used for communicating signals between RFID tags employed for tracking entities at a site.

As shown in FIG. 8, a tracking system management server 132 is coupled to location engine server 40 over a public network and similarly provides secure Internet (or other network) access to the location engine servers at various other dealerships to enable network management of the entity tracking systems at each dealership. Tracking system management server 132 is used to enable the remote management of the entity tracking system at each dealership without compromising the security of the dealership's network.

Fixed Transceivers

As explained above, the entity tracking system employs a plurality of fixed transceivers or RFID tags that include the same electronic circuitry used in the portable RFID tags associated with entities at the site. These fixed RFID tags, which include the bridge node(s), and master nodes, serve as location reference points for position tracking and provide communications between the portable RFID tags and location engine server 40. The fixed RFID tags can communicate with each other and the location engine server using a combination of proprietary 900 MHz data links (although, it will be recognized that a different frequency might instead be used), which operate with the same format as RFID tag communications, as well as by WiFi (in accord with the IEEE 802.11a, b, g, and/or n specification), and hard wired Ethernet connections, although other types of additional communications links can be employed. Selection of a communication format for other than the RFID tag communications will depend upon the type of wired connection availability and the required range.

Types of Fixed Nodes

There are four types of fixed nodes that can be used in this exemplary embodiment of the entity tracking system. Each type is defined by both its operational functionality and its hardware capability. In general, fixed nodes are essentially RFID tags with fixed locations and permanent power supplies or rechargeable battery supplies that are coupled to dedicated recharging power sources. Units of this type are always "listening" for communications from any other RFID tags in their area. When the system is initially installed, the exact location of each fixed node can be measured, for example using a precision GPS receiver, and communicated to the location engine server, which will use the fixed locations in order to reference RFID tag locations to the physical layout of the dealership site.

Fixed nodes are designed to be able to use one or more of multiple different power sources. For large dealer lots, it is envisioned that the fixed nodes can be mounted on poles such as pole 50 (FIG. 2) that are used for supporting lighting fixtures, such as lighting fixture 52, for the lot. Since the lighting fixtures mounted on these poles may only be supplied with power when the lights are turned on at dusk, the fixed nodes can use batteries to operate during the day, and the batteries will be recharged at night using the AC power supplied in the AC line circuits that energize the lights. Alternatively, the fixed nodes can use solar cell panels 54 during the day for operation and for battery charging, and can then operate on battery power during the night or other reduced ambient light conditions. An advantage of the solar cell/battery power scheme is that it eliminates the need for an electrician to connect to the lighting circuits on the poles during installation of the entity tracking system. For fixed nodes installed on a building exterior, such as bridge node 34 (FIG. 3) or at interior installation positions, it is expected that the fixed nodes will be continually supplied with power from an AC line source that is provided in the building. A dealer site that uses 1100 RFID tags (e.g., 500 vehicle RFID tags 38, 500 key RFID tags 86, and 100 personnel badge RFID tags 122) is expected to require approximately 40 fixed nodes.

The first type of fixed node is the master node. Master nodes 32 (FIGS. 1 and 2) are simply RFID tags with permanent power supplies, as discussed above, that are mounted at calibrated fixed locations. The master nodes are always on and "listening" for communications from other components in the entity tracking system. The primary function of the master nodes is to listen for transmissions from nearby RFID tags and assemble a list of tag identities and receive power data to be forwarded to the location engine server. Master nodes communicate with other infrastructure nodes and RFID tags using a proprietary 900 MHz protocol in this embodiment, although other protocols, frequencies, and formats can instead be used.

The second type of fixed node is a bridge node. Bridge nodes 34 (FIGS. 1 and 3) are identical to master nodes 32, as described above, except that they incorporate the electronic circuitry necessary to use wired Ethernet or wireless WiFi signals for communication with other fixed nodes, and with location engine server 40. Bridge nodes can typically be used to connect small widely separated lots or structures at a dealer site. In general, it is expected that only 20% of fixed nodes will be of the bridge node type.

The third type of fixed node is a controller master node (not shown in FIG. 8). Controller master nodes are identical to the master nodes as described above, in terms of hardware, but have additional functionality. Nodes of this type coordinate the communication of the RFID tags in their "control" area with each other and with the other master nodes. In particular, controller master nodes maintain a list of RFID tags currently under their control and establish the timing of communications between the RFID tags. In case of the failure of a controller master node, its functionality can be transferred to another master node by the location engine server. In extreme cases, this functionality could be transferred to a portable RFID tag. The downside of such a transfer is that the continuous listening and communicating state of the controller master node would rapidly consume the battery power of the portable RFID tag. In this situation, the controller master node functionality could be switched between successive different portable RFID tags in order to balance the power consumption across many such portable RFID tags.

Finally, the fourth type of fixed node is a controller bridge node. Controller bridge nodes 36 (FIGS. 1 and 8) have the hardware capabilities of bridge nodes 34 with the functionality of controller master nodes. Nodes of this type can be used to connect large widely separated lots, structures, or entire dealer facilities.

Access Points

Access points 134 (FIG. 8) are commercially available (e.g., from Linksys, D-Link, Belkin and other sources) as indoor or outdoor WiFi hardware, which receive wireless WiFi signals meeting the IEEE 802.11a, b, g, and/or n specifications, from bridge nodes and controller bridge nodes 36 (FIG. 8) and connect to a wired Ethernet line to provide communication with location engine server 40, based on an assigned address of the controller bridge node on the dealer's local area network. For example, a dealership with 500 vehicle tags is expected to require approximately 2-3 access points 134.

Tracking Modes

The tracking functionality of the entity tracking system is slightly different for each type of RFID tag being tracked, which is primarily due to the need to maximize battery life, while taking into account the expected daily motion of each type of RFID tag. In general, vehicles and their RFID tags 38 will move just a few times a day, whereas keys and personnel, with their attached RFID tags 86 and 120, will move much more frequently. As a result, the entity tracking system will track RFID tags in either a coarse resolution mode or a fine resolution mode, as described below.

Coarse Resolution Tracking Mode

The coarse resolution tracking mode is primarily used for personnel and key RFID tags 120 and 86 tracking and for tracking vehicle RFID tags 38 when they are in motion and between mesh updates. In this coarse resolution mode, a portable RFID tag is only communicating with the infrastructure nodes (i.e., the fixed RFID tags), and its general location can be determined based on a limited number of received signal strength measurements from the nearby infrastructure nodes. If either time of flight or angle of arrival is instead being used to determine the position of the RFID tag that is transmitting a signal, the infrastructure nodes will again be the only nodes that determine the position of the transmitting RFID tag relative to their positions.

Fine Resolution Tracking Mode

The fine tracking mode updates the position of the portable RFID tags based upon both RFID tag-to-RFID tag and RFID tag-to-infrastructure node communication, i.e., during a scheduled mesh update. The more RFID tags communicating, the more accurate will be the determination of the relative positions of the entities being tracked. Because all RFID tags in a particular lot participate in the session, relative positions and order of RFID tags can be accurately established.

System Operation

This following discussion explains the communications between each of the hardware elements in the entity tracking system. In addition, the core activities required by the tracking system and the user to perform various functions are described.

Initial Installation and Calibration of the Entity Tracking System

Initial installation and calibration of this system is typically carried out when the tracking system is first installed at a dealer site. These steps may have to be repeated if the dealership expands or if the physical layout of the site is changed substantially.

Initially, a survey of the site can be performed to determine the equipment required and its optimal physical location on the site. Each master node 32 will then be installed and its location can be accurately determined, e.g., by using a GPS position receiver. Location engine server 40 can then be installed in the computer closet or other suitable room at the site. Alternatively, the location engine server could be installed in an off site date center and connected to the dealership's infrastructure using a wireless modem, the Internet or other network, or a landline connection. The master nodes and the location engine server are next coupled together with a wired or wireless (or a combination thereof) infrastructure. For example, CAT 5E or better Ethernet cables can be used to hard wire connect bridge nodes 34 to a switch and thus to the location engine server that is disposed in the computer space.

The dealer facility should then be mapped and integrated for display in a graphics user interface (GUI) on the terminals that will be used for displaying the nominal relative position of the entities that are being tracked at the site. The software that will be executed on the location engine server can be installed and provided with a database of the vehicle identification numbers (VINs) for the dealer vehicle inventory, or the data can be input by integrating the inventory database with the entity tracking program that is running on the location engine server.

Next, RFID tags 38 can be installed on the vehicles in the inventory, so that the association of each RFID tag can be mapped to the vehicle (by VIN) on which it is installed. RFID tags 86 are then installed on the vehicle keys and also mapped to the vehicle (by VIN) to which each key belongs.

The vehicles that are brought into the dealership by customers for service will be associated with a vehicle work order and the work order data can be loaded into the location engine server, or alternatively, the service facility data can be integrated with the entity tracking system to provide access to the data for the vehicles being serviced. RFID tags 38 can be installed on the vehicles in service, so that the association of each RFID tag can be mapped to the vehicle work order on which it is installed. Similarly, RFID tags 86 will be installed on the service vehicle keys and mapped to the work orders for the service vehicles with which each keys are used. The key storage/charging station can then be installed and the keys (with their RFID tags) for the vehicles can be placed on the storage rack(s) and/or the RFID tags inserted into the charge slots.

All personnel of the dealership will have been assigned an identification badge with an associated RFID tag and the badge will typically include an employee picture. A database can be created that includes personnel names (and other data) along with pictures of the employees, for association with corresponding RFID tag numbers.

Radio Network Layout

Figure 9:
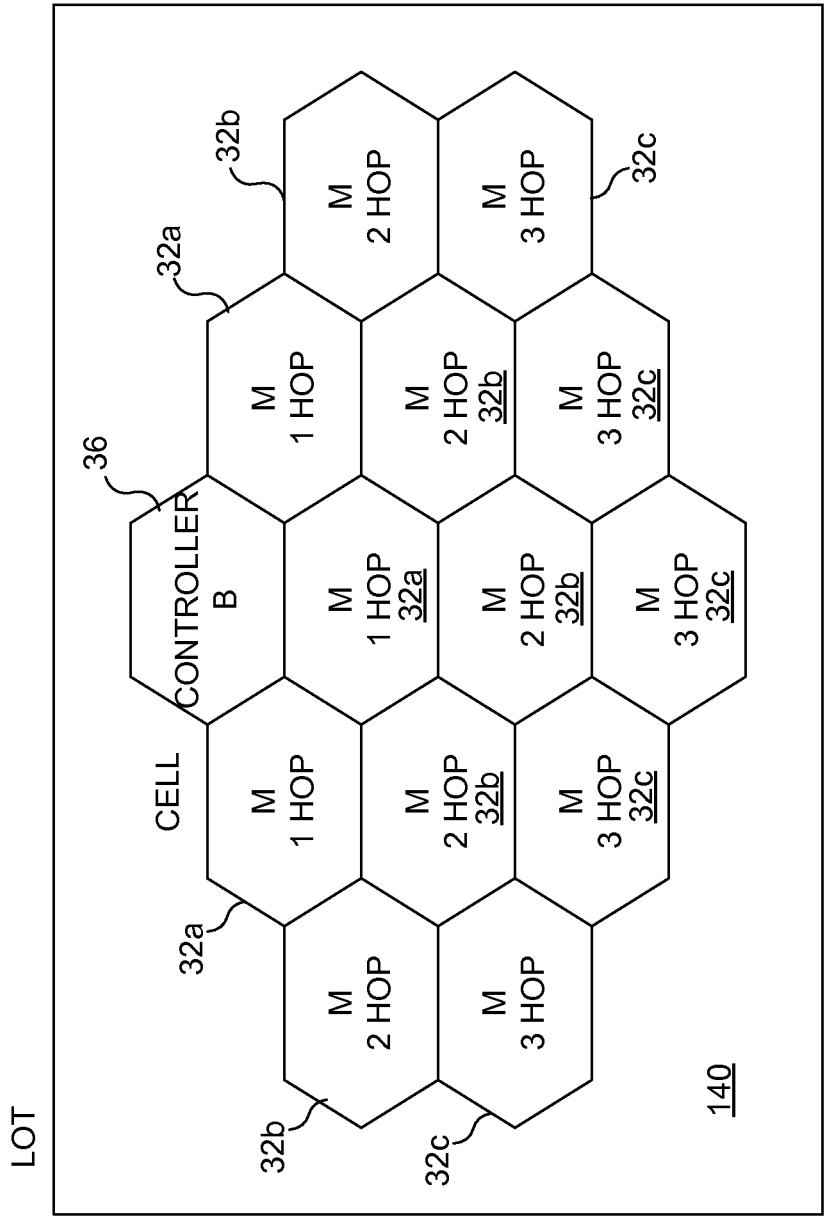
FIG. 9 is a schematic illustration showing an exemplary logical lot partitioning and the number of hops between a controller node and master nodes disposed on the lot of a dealership.

A dealership site is typically broken up into distinct lots, each of which can be under the control of a single controller—either a controller master node or a controller bridge node. FIG. 9 illustrates one example of a lot 140 having a controller bridge node 36. Further, each lot may be divided into radio cells under the domain of a single master node. Physical and logical lots are not required to be identical, but it is logical and recommended that they coincide. As shown in FIG. 9, master nodes 32 are designated by the number of hops or communication links between each master node and controller bridge node 36. Thus, each master node 32*a* is identified as a one hop master node if it is communicates over only one link with controller bridge node 36, master nodes 32*b* are designated as two hop master nodes, since they communicate through the one hop master nodes (i.e., via two communication links), with the controller bridge node. Similarly, master nodes 32*c* are shown as three hop master nodes, because they must communicate with the controller bridge node through the two hop and the one hop master nodes, for a total of three communication links.

The logical lots can typically be assigned to cover actual corresponding physical lots on the site. However, logical lots may span multiple physical lots and similarly, a physical lot may require multiple logical lots because of its size.

Figure 10:
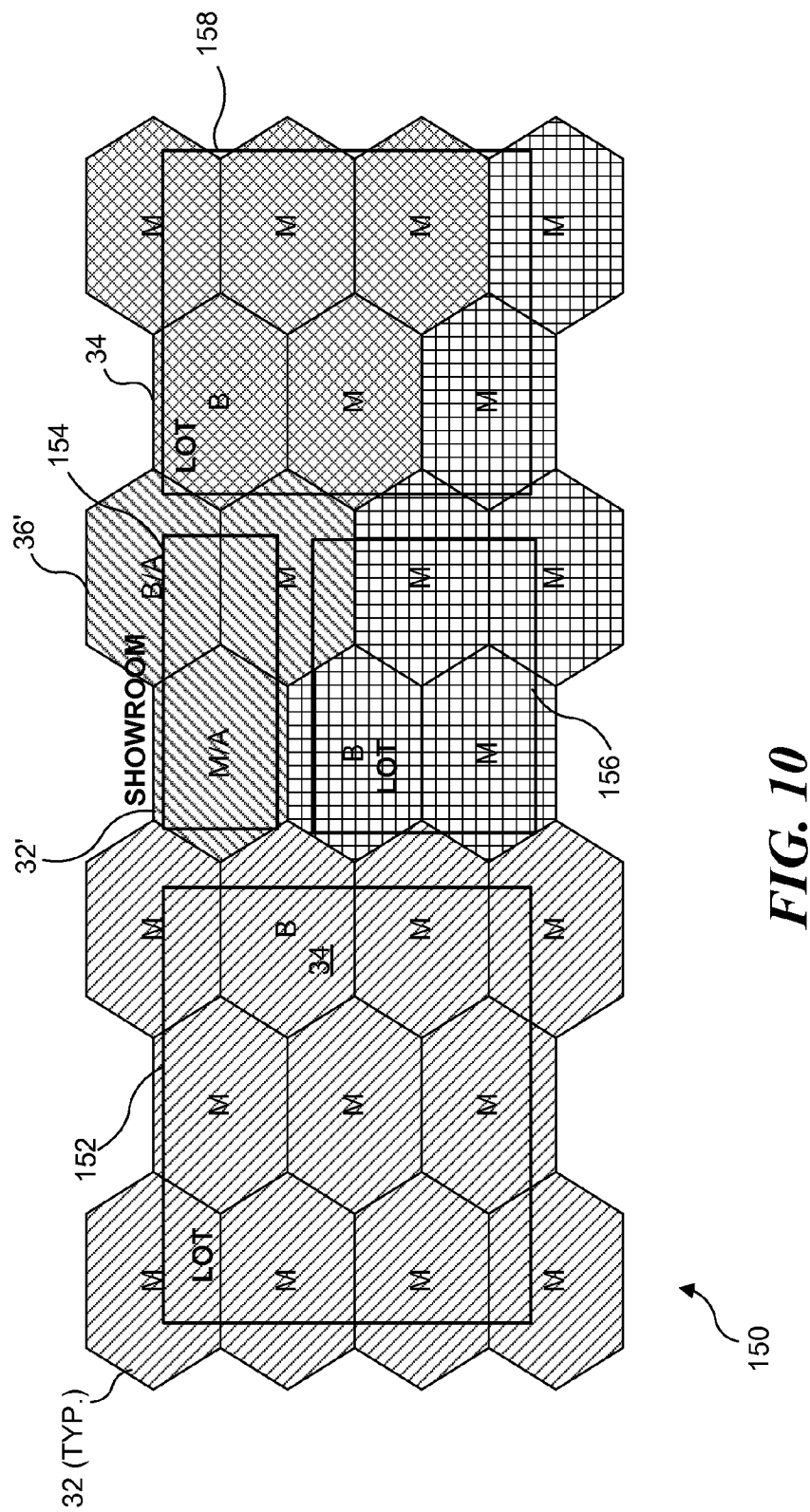
FIG. 10 is an overlay of an exemplary site layout with the logical lots used in connection with tracking entities on the site.

FIG. 10 illustrates an example of an overlay 150 of logical lots on physical lots, including a lot 152, a showroom 154, a lot 156, and a lot 158. The logical lots are indicated by the four different cross hatch patterns in each cell. The logical lot corresponding generally to showroom 154 includes a master node 32' and a controller bridge node 36', each having an access point, which is designated by the letter "A."

Note that each logical lot in FIG. 10 includes a controller bridge node 36 or a bridge node 34 for communicating to the lot controller, which may be physically located in another lot. In both cases, the controller communicates data to the local engine server (not shown in this Figure). The access points in the showroom enable WiFi communication between the bridge nodes and the location engine server.

Packet Radio Network Configuration

Figure 11:
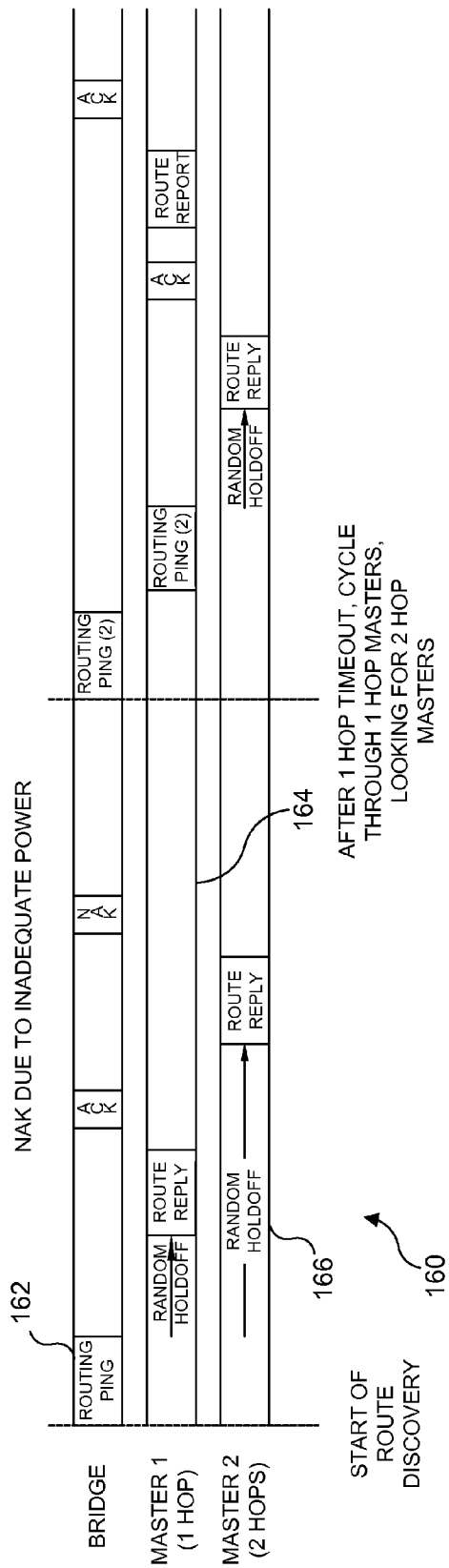
FIG. 11 is a schematic timing diagram illustrating an exemplary routing table determination for the system used for tracking entities at a site.

The radio network configuration begins after the radio network infrastructure is installed. Once the infrastructure nodes are configured the RFID tags can be deployed and will automatically join the network. The packet radio network configuration is performed on a lot (logical)-by-lot basis. The configuration is initiated by commanding the bridge nodes to begin the discovery process for the infrastructure nodes in the lots within range of each bridge node 34. The results of the discovery process are relayed back to the location engine server, which determines the routing tables for the discovered infrastructure nodes. The routing tables are then sent back down the packet radio hierarchy to each layer or node in sequence, in order to establish the packet radio routing. The routing is controlled by the location engine so that physical constraints of the dealership can be taken into account in the construction of the routing tables. Once the routing is completed for a single bridge node, the location engine server will repeat the routing process on all the remaining bridge nodes. Once the location engine server has completed the routing tables for all the master nodes included in the lots, the location engine server will parse the dealership into logical lots and assign controller status to fixed master nodes in each of the lots. Once controllers are assigned, they will notify the other master nodes within their lot to report to them. Once masters are allocated to controllers within the lots, the master nodes will begin allowing RFID tags to join the network. FIG. 11 illustrates an exemplary routing configuration process 160 for a single bridge node 34.

The process includes the steps 162 carried out by the bridge node, responses 164 by one hop master nodes, and responses 166 carried out by two hop master nodes. In this process, after a one hop timeout has occurred, the process cycles through the one hop master nodes looking for two hop master nodes. The route report is produced and is used for creating the routing table.

Joining the Network

Figure 12:
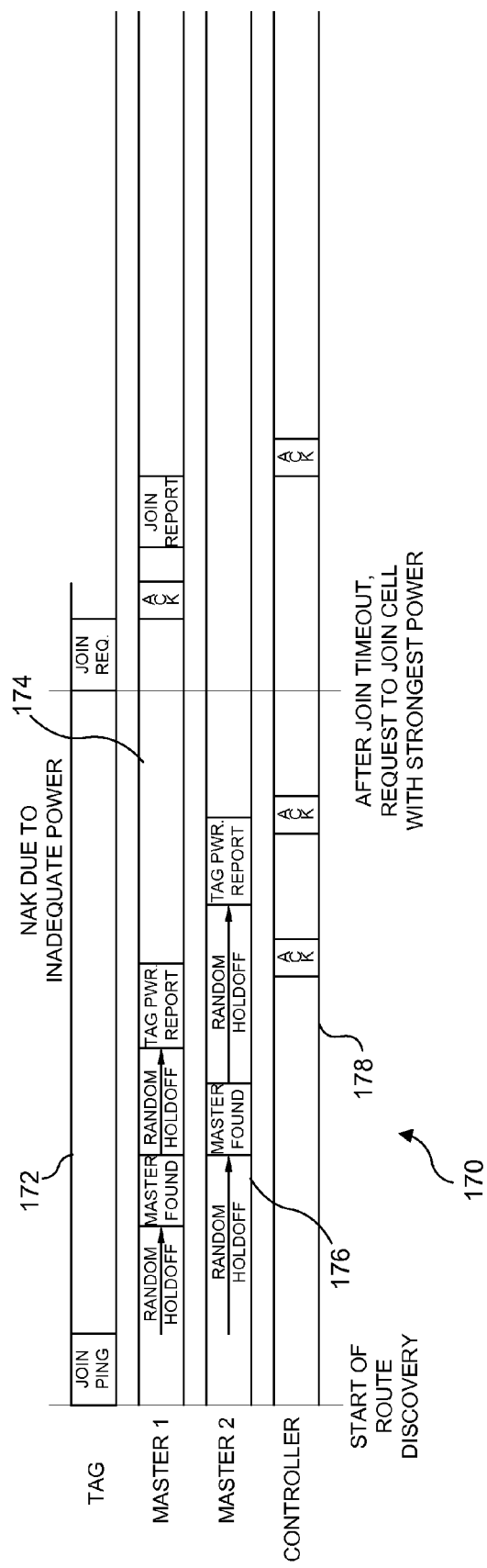
FIG. 12 is a schematic timing diagram illustrating the process used by a RFID tag that is joining the network of RFID tags.

RFID tags that become orphaned or that are subsequently added to the network are required to join the network through a joining exchange between the RFID tag and the local infrastructure nodes in the network. An exemplary joining exchange 170 is illustrated schematically in FIG. 12. The RFID tag that is joining sends out a join ping and a join request as shown in a line 172. A line 174 indicates the responses of a first master node, while a line 176 indicates the responses of a second master node in the local infrastructure. These responses include a report of the RFID tag received power level determined by each master node. The RFID tag will then join the cell having the master node reporting the highest or strongest received power level. A line 178 indicates the acknowledge (ACK) transmissions by a controller node.

Exemplary Location Session Process

Figure 13:
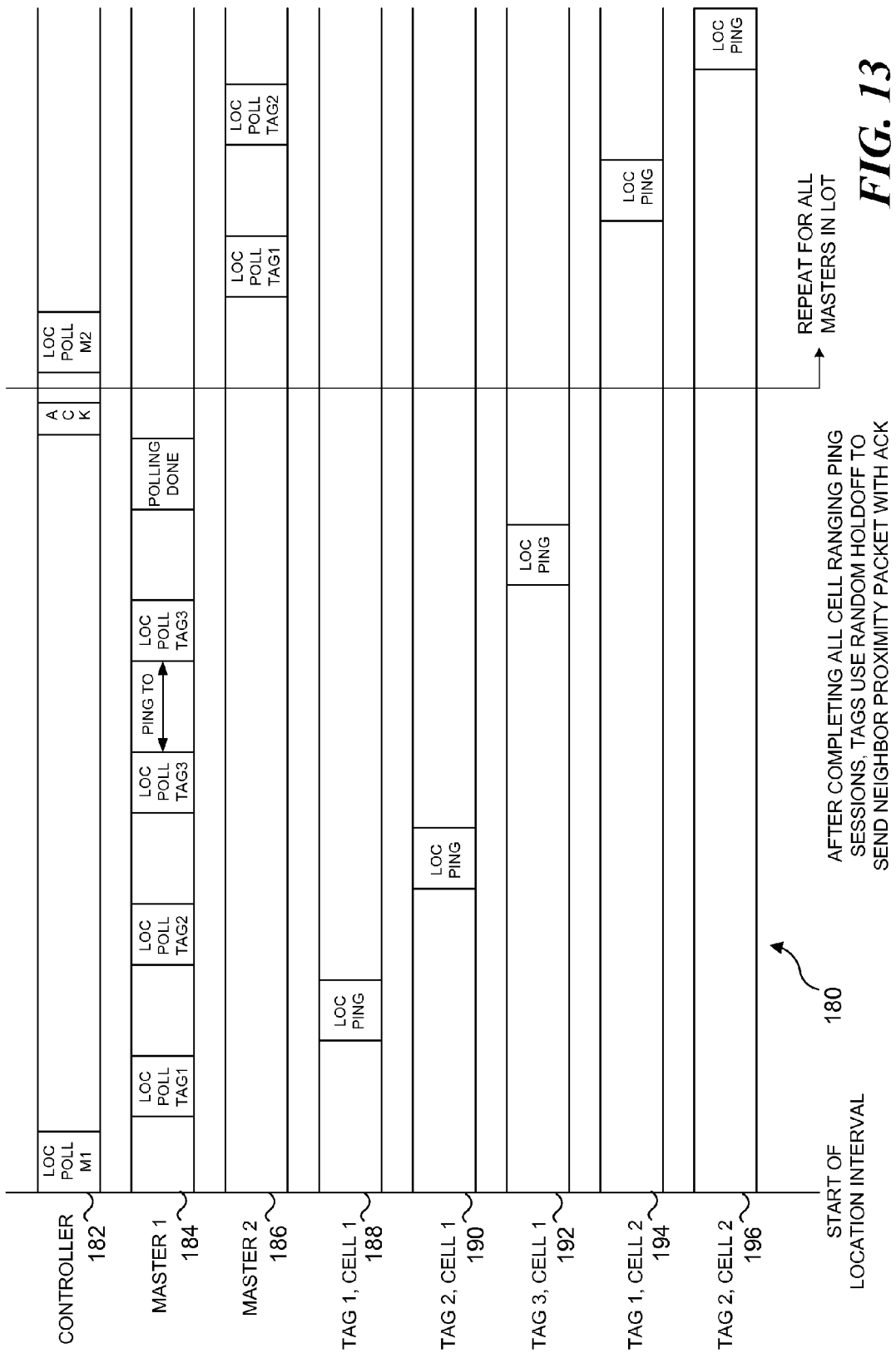
FIG. 13 is a schematic timing diagram illustrating an exemplary location session process for the present novel approach.

FIG. 13 illustrates an exemplary location process 180 that is used for obtaining transmissions from a plurality of portable RFID tags to determine their relative location at a site. A line 182 illustrates the location poll transmission by a controller node, in regard to a first master, which responds as shown in a line 184, and a second master, which responds as shown in a line 186. The first master transmits a further set of location polls to RFID tags in cell 1, and each cell responds with a location ping signal (i.e., a transmission that includes an identification of the RFID tag then transmitting), as shown in a line 188 for a RFID tag 1, in a line 190 for a RFID tag 2, and in a line 192 for a RFID tag 3. Similarly, the location poll of RFID tags 1 and 2 in cell 2 is then carried out by the second master, which causes the location pings to be transmitted by those RFID tags, as indicated in lines 194 and 196, respectively. The ping signals are transmitted by each of the RFID tags and received by their neighbors. A random holdoff time interval is applied before each RFID receiving the signals from its neighbors reports its ID, the received signal strength of the signals it received (or alternatively, the time of flight or angle of arrival of the signal), and the ID of the RFID tags that transmitted the signals received in a packet, with an acknowledgement (ACK). These packets are subsequently transferred by the controller node to the location engine server, so that it can determine the relative location of the portable RFID tags at the site that are included in the data.

Examples of Entity Tracking System Functionality

A typical use of the tracking system will arise when a customer visiting the dealership indicates an interest in seeing and possibly test driving a vehicle in the dealer's inventory. A salesperson will use a terminal in the dealer sales area to identify the vehicle to be viewed and possibly test driven, using the database of dealer inventory, perhaps searching by characteristics such as model, color, desired installed options, etc. The vehicle thus selected can be identified by its VIN or stock number. The salesperson can then use the terminal in communication with the location engine server to locate the vehicle on the dealer lot based on the data sent to location engine server 40 by the infrastructure and portable RFID tags, as well as identifying any other vehicles that are parked around the desired vehicle and must be moved to enable the desired vehicle to be driven. In addition, the terminal will be used to access the location engine server to locate the key for the desired vehicle and the keys for any other vehicle that must be moved to gain access to the desired vehicle. This information will be graphically displayed on the terminal in regard to showing the nominal locations of these entities on the lot or other locations on the site, and in regard to the location of the keys on the storage rack, or in the possession of some other personnel. For example, if the key or keys are shown to have been removed from the key storage rack by another salesperson, using the location server engine to provide the information for display on the terminal, the nominal location of each such other person will be graphically (or textually) indicated. The salesperson (or a helper) can thus obtain the keys for the desired vehicle and any vehicle that must be moved, go to the location of the desired vehicle on the lot, move the vehicles that are in the way, and drive the desired vehicle to a designated temporary parking position where the customer can be checked out to test drive the vehicle, with or without the salesperson accompanying the customer on the test drive (depending on the procedures in place at the dealership for handling test drives).

In addition to enabling the salesperson to find the car and the keys necessary to enable a customer to take a test drive, the entity tracking system provides additional functions. Assuming that the salesperson accompanies the customer on the test drive, the motion of the vehicle toward the exit from the site will be detected by the accelerometer on any key RFID tag 86 in the vehicle as well as any vehicle RFID tag 102, causing the key RFID tag and the vehicle RFID tag to transmit continuously (or at least, more frequently), which will enable the entity tracking system to do a coarse mode tracking of the key and the vehicle as the vehicle exits the site. The location engine server can thus maintain data indicating the specific vehicle being driven from the lot and the time of its departure from the lot. Further, the location engine server can store the identification of any key RFID tag that is in the vehicle at that time, along with the salesperson's badge RFID tag. When the vehicle returns to the lot after the test drive, location engine server 40 can also record that time and the corresponding key RFID tag 86 and vehicle RFID tag 102 information, as well as the salesperson's badge RFID tag 120. The local engine server thus monitors who has possession of each vehicle key RFID tag both before and after the test drive. This information can be used if a key is lost, since the last person having possession of the key should be indicated in the retained data.

Occasionally, a customer will be allowed to take a test drive without a salesperson accompanying them. In this circumstance, the customer can be given a temporary visitor badge RFID tag 120, and the location engine server and tracking system will monitor RFID tag 86 on each key in the vehicle, visitor badge RFID tag 120, and vehicle RFID tag 102, both when the vehicle is driven from the lot and when it returns. The tracking system will record both the time of departure and the time of return of the vehicle and verify that the visitor badge RFID tag is returned to the badge storage rack. If the visitor badge RFID tag is not returned and the customer leaves the lot with it (a condition that is detected since the visitor badge RFID tag is not accompanied at that time by a vehicle or key RFID tag), the tracking system will disable the visitor badge RFID tag in the system data so that the customer cannot reuse the badge. In addition, the system will notify the salesman who issued the visitor badge RFID tag so he may recover it.

When a vehicle is sold, as indicated by changes entered into the database of the location engine server, the RFID tags on the vehicle and on its keys will be removed. The tracking system can again detect if an RFID tag has been left on the vehicle or on the keys for it as the vehicle is driven from the lot by the new owner.

Another important function will be monitoring the location of customer owned vehicles left for servicing by the dealer vehicle service facility. When a customer drops off a vehicle for service, the customer/vehicle information will be entered into the database in connection with the work order for the service job. Appropriate RFID tags will then be assigned to and installed on the vehicle and the key for the vehicle, so that their identifications can be tracked in connection with the work order. The tracking system will verify that the key RFID tag for the vehicle is being used when the vehicle is next moved (by determining that the vehicle RFID tag and the key RFID tag are both located in the moving vehicle). The location of the customer vehicle can be tracked by the location engine server in regard to the RFID tag applied to the vehicle, while the vehicle remains at the dealer facility, so that when service is complete and the customer stops by to pick up the vehicle, the location of the vehicle and of its key will readily be determined by the service manager using a terminal connected in communication with location engine server 40. When a customer picks up a vehicle after it is serviced, the vehicle RFID tag and key RFID tags will be removed from the database in preparation for use with another customer vehicle and the key for that other vehicle. As the customer drives a serviced vehicle from the lot, the tracking system will monitor it to ensure that no RFID tags of any type have been left on the vehicle.

A core part of the tracking system functionality is key tracking using key RFID tags 86. This function is carried out 24 hours a day and includes the task of monitoring who has taken a key from the storage rack, to whom a key has been passed, when a key is in a vehicle, determining if a key is moved independently of an employee or vehicle with which it is paired, for example in a vehicle that does not include an RFID tag (and if so, signaling an alarm, since the key is probably inadvertently being carried away by an employee or customer leaving the dealership and forgetting that they have the key in their possession), and monitoring which of the personnel has returned a key (based on detecting the common location of the key RFID tag and the badge RFID tag of the employee returning the key, as the key is placed back in the storage rack).

If a key leaves the dealer lot with an employee who is leaving after their work period has ended, the location engine server can send a text message to alert the employee, so that the employee can return the key to the dealer key storage rack as soon as possible. If the person leaving the dealer facility with the key is not carrying a badge with RFID tag 120, the text message can be sent to the last person having a badge with RFID tag 120, who held the key, since that person probably still has the key.

Monitoring the general location of salespeople, managers, and other personnel using RFID tags 120 mounted on the employee badges is another very useful function of the tracking system. While privacy concerns may preclude enabling the tracking system to display a precise location of an employee, it will often be sufficient to determine, for example, that an employee is in the northeast corner of a lot or is in the customer lounge, etc. It should also be understood that if the employee is carrying a key having an RFID tag that has been associated or paired with the employee when the key was removed from the storage rack by that person or when they key was handed to the employee by another employee, the employee can be located more specifically based upon the location determined for the key RFID tag. Each employee's badge having the RFID tag can be checked in and out from the reception desk at the beginning or end of each work shift by the employee, and the reception desk can be provided with a badge RFID tag battery charger.

Related functions that can be implemented in connection with the badge RFID tags include determining employee daily arrival and departure times, based on when each employee checks out their badge with its RFID tag from the storage rack just after arriving at the dealership, and when they turn the badge back to the storage rack just before leaving the site. The system can then communicate employee arrival and departure data to a payroll system running on another computer, on a biweekly or bimonthly basis. This information can be used if a dealership wants to track employee arrival and departure times using the present tracking system, in lieu of using a conventional time card system. Since the tracking system also monitors when an employee with a badge leaves the lot with a vehicle and detects a vehicle leaving the lot and being driven by someone without an employee badge having an RFID tag, it can be used to track improper vehicle use, or vehicle theft.

New inventory cars are delivered to dealerships on a regular basis. When these cars arrive, they are typically offloaded from a truck and inspected. It is contemplated that shortly after a new car arrives at the dealership, the database maintained on the location engine server that indicates vehicles in inventory would be updated to include the VIN of the new vehicle. (Alternatively, the location engine server can simply use updated data from the conventional dealership inventory database that is maintained for other functions by a dealership, or it can download data for the new vehicle from dealership management software, or from the factory database, e.g., on an Internet link.) A RFID tag can then be installed on each new vehicle and mapped to the VIN of the vehicle. Similarly, a RFID tag can be installed on each key for the new vehicle and can be mapped to the VIN of the vehicle with which the key is used. Used cars and the keys provided for them can be handled in a similar manner.

The tracking system can also monitor service test drives that occur when a technician takes a vehicle being serviced on a test drive to check out a reported problem or to determine if a repair was successful in correcting a problem. The tracking system can monitor all keys bearing RFID tag 86 that are in the vehicle at the time of departure and return, and determine who had possession of the keys at that time, as well as recording the time of the departure and return of the vehicle. Similar functions can be carried out in connection with service loaner vehicles that are provided to customers while the customer vehicles are being repaired. The key and vehicle RFID tag data for the service vehicles can then be associated with the work orders for the customers receiving the loaner vehicles.

Since an RFID tag will not function after its battery voltage is below a minimum operational level, each RFID tag can send an indication to the dealership's inventory manager when the battery level of the RFID tag is at or below some predefined level (e.g., 15%) of its remaining life. This low battery status can be reported via the radio network to location engine server 40, which can then issue a consolidated report of all RFID tags with low batteries to the inventory manager at the beginning of each day or at some other designated interval or time. In addition, a flashing LED or bi-stable indicator can be included in any RFID tag circuit to indicate a low battery condition of a RFID tag. It is also contemplated an audible alarm can be provided on a badge RFID tag to indicate a low battery condition. When the battery is at a low level, the RFID tag can enter a special low update rate status, with reduced frequency of transmissions of signal to other RFID tags and of data relating the identification and received signal strengths (or alternatively, either the time of flight or angle of arrival) of signals received from other RFID tags.

There are a number of additional inventory management and analytic functions that can be performed by the tracking system, which will primarily be of use to the dealership's management team. These functions may also be of interest to corporate management if the dealership is part of a larger group, and include, by way of example (but are not limited to), daily inventory management, reporting vehicles that have not moved in 30, 60, and 90 days, monitoring vehicles for theft, monitoring vehicles that are in motion without an employee or authorized visitor RFID tag inside, detecting vehicles that leave the lot without having their keys with RFID tags 120 checked out by an authorized person and/or leave without a key RFID tag 86, identifying vehicles that are not on the lot at the end of the day but have not been logged out of the system appropriately, monitoring the anti-tamper switch to determine if an RFID tag has been removed from the mounting surface of the entity on which it was attached, mapping the locations on the lot where vehicles sell the fastest, and monitoring keys for theft/loss. Various other reports relating to inventory management and employee performance can also be compiled based upon the monitoring and reporting functions of the tracking system RFID tags.

Exemplary Computing Device for Implementing Functions

Figure 14:
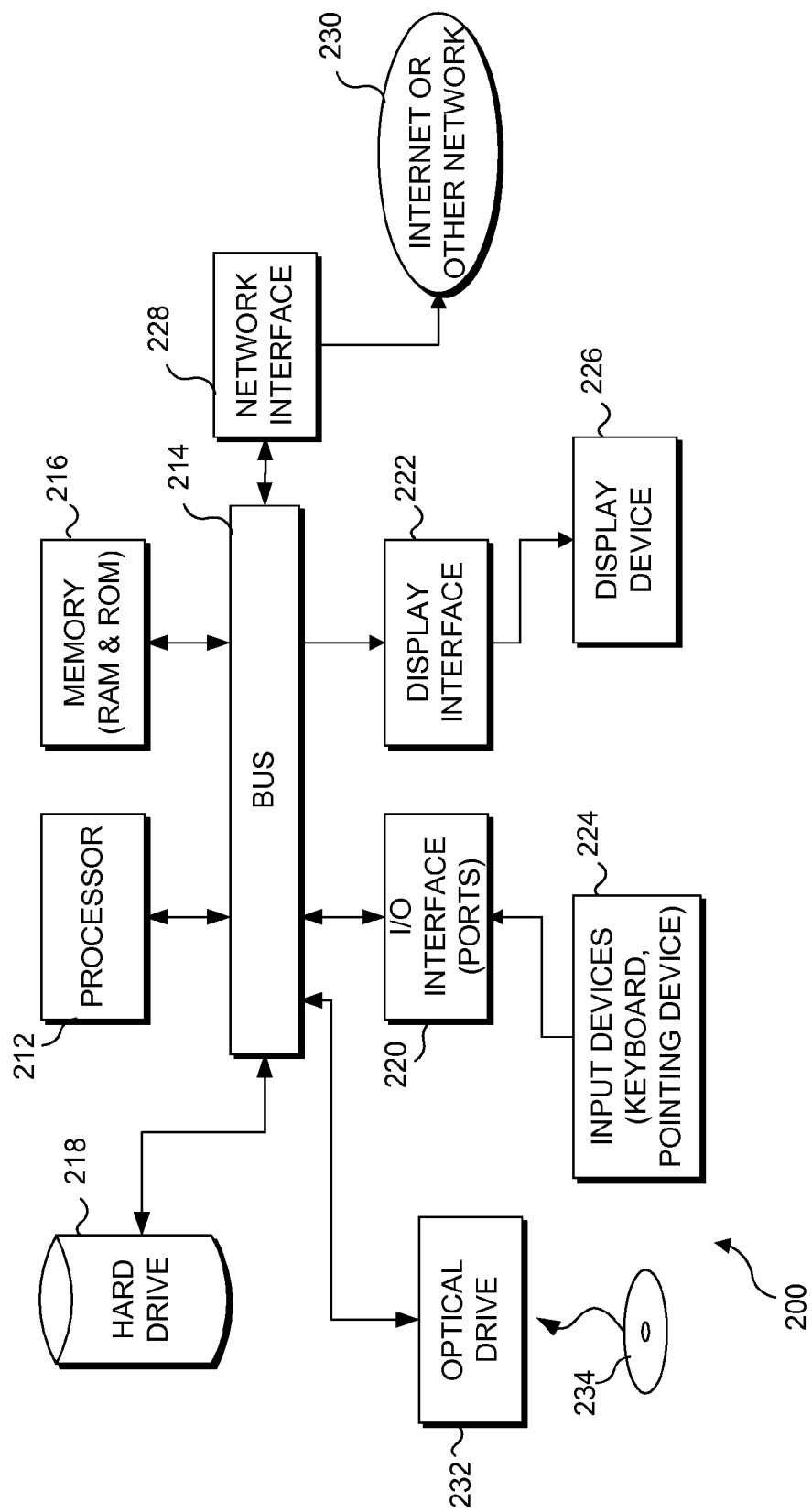
FIG. 14 is a functional block diagram of a computing device (e.g., a personal computer) that is generally usable to carry out the novel approach that is discussed herein.

FIG. 14 illustrates details of a functional block diagram for a computing device 200, which can be used for location engine server 40 as well as for the terminals used for accessing location information for entities at the site. The computing device can be a typical personal computer, but can take other forms in which a logic or hardwired device carries out the steps of the procedure described above for tracking entities at a site. In this exemplary embodiment, a processor 212 is employed for executing machine instructions that are stored in a memory 216. The machine instructions may be transferred to memory 216 from a data store 218 over a generally conventional bus 214, or may be provided on some other form of memory media, such as a digital versatile disk (DVD), a compact disk read only memory (CD-ROM), or other non-volatile memory device. An example of such a memory medium is illustrated by a CD-ROM 234. Processor 212, memory 216, and data store 218, which may be one or more hard drive disks or other non-volatile memory, are all connected in communication with each other via bus 214. The data regarding entities such as personnel, or vehicles can be provided as a stored file on data store 218, or can be input from an external program, such as a conventional database program used for input and use of employee or vehicle inventory data. The machine instructions in the memory are readable by the processor and executed by it to carry out the functions discussed above in regard to each exemplary embodiment. Also connected to the bus may be a network interface 228, an input/output interface 220 (which may include one or more data ports such as any of a serial port, a universal serial bus (USB) port, a Firewire (IEEE 1394) port, a parallel port, a personal system/2 (PS/2) port, etc.), and a display interface or adaptor 222. Queries by users to locate entities at the site can be input to computing device 200 through the input/output interface. The results showing the nominal or relative position of the entity whose location is being queried can be shown to the user on a monitor or display device 226 or can be conveyed through a network to a separate terminal on which the query was input for display to the user.

Any one or more of a number of different input devices 224 such as a keyboard, mouse or other pointing device, trackball, touch screen input, bar code reader, etc., are connected to I/O interface 220 for control of the system and input of control choices and data. Monitor or other display device 226 is coupled to display interface 222, so that a user can view graphics and text produced by the computing system as a result of executing the machine instructions, both in regard to an operating system and any applications being executed by the computing system, enabling a user to interact with the system. An optical drive 232 is included for reading (and optionally writing to) CD-ROM 234, or some other form of optical memory medium. Thus, reports or other data generated by the program can be saved to a CD-ROM, if desired.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for tracking entities, to determine at least a relative location of the entities at a site, comprising the steps of:
   (a) creating a mesh network at the site that is formed of a plurality of portable radio frequency identification (RFID) tags, and a plurality of fixed RFID tags, all of which transmit and receive radio signals, the portable RFID tags each being associated with a different entity from a plurality of different types of entities that can move around at the site, each portable RFID tag being physically coupled or attached to the entity with which it is associated, at least some of the portable and static RFID tags that are associated with the entities including a sensor for detecting when the RFID tags are in motion, wherein a portable RFID tag that has not moved from a previous known location comprises a static RFID tag, and wherein the plurality of fixed RFID tags remain in at known locations;
   (b) repetitively causing each RFID tag to transmit a signal that conveys an identification of the RFID tag that is transmitting the signal, the signal that is transmitted being received by any other RFID tag disposed within a receiving range of the signal that was transmitted, wherein the RFID tags that are receiving the signal include one or more of the fixed RFID tags or static RFID tags, each fixed or static RFID tag having a known position on the site, and wherein the step of repetitively causing each RFID tag that is associated with one of the entities to transmit a signal includes the step of causing each RFID tag having a sensor that is detecting movement of the RFID tag, to continuously or at least more frequently transmit a signal identifying a portable RFID tag that is in motion, so that the portable RFID tag that is in motion can be at least tracked in a coarse tracking mode as the portable RFID tag is moved about at the site;
   (c) each RFID tag that receives the signal being transmitted determining a location indicative parameter and saving the location indicative parameter in connection with the identification of the RFID tag that transmitted the signal;
   (d) forwarding data comprising the location indicative parameter and identification of each portable RFID tag that is moving, for each of the signals that was received by an RFID tag, to a processor, along with an identification of the RFID tag that is forwarding the data; and
   (e) using collaborative multi-lateration for processing location indicative parameters in relation to the known positions of the fixed or static RFID tags and the identification of the RFID tags forwarding the data, as well as the identification of the portable and fixed or static RFID tags originally transmitting signals, for determining at least relative positions of the entities at the site.

2. A system for tracking entities, to determine at least a relative location of the entities at a site, comprising:
   (a) a mesh network comprising a plurality of radio frequency identification (RFID) tags, including at least one fixed RFID tag, which is not moved from a known location, or at least one static RFID tag currently disposed at a known location at the site, and a plurality of portable RFID tags, each portable RFID tag being associated with a different one of the entities that can move about at the site and physically coupled or attached to the entity with which it is associated, the static RFID tag comprising a portable RFID tag that has not moved from its last known location, each of the RFID tags being controlled so as to transmit a signal that includes an identification of the RFID tag transmitting the signal, the signal being received by any other of the plurality of RFID tags that is in range, each RFID tag that receives the signal determining a location indicative parameter for the signal and storing the location indicative parameter in connection with the identification of the RFID tag transmitting the signal, at least some of the plurality of portable RFID tags including a sensor that detects when the portable RFID tag and the object to which it is attached or coupled is in motion, the portable RFID tag that is in motion responding to the sensor detecting the motion of the portable RFID tag by continuously or at least more frequently transmitting the signal identifying the portable RFID tag that is in motion, so that the portable RFID tag can at least be tracked in a coarse tracking mode by the system as the portable RFID tag is moved about at the site; and (b) a processor that is configured to carry out a plurality of functions, including:
  (i) repetitively causing each RFID tag that is associated with one of the entities to transmit the signal;
  (ii) receiving data comprising the location indicative parameter and identification of the RFID tag for each of the signals that was received by an RFID tag, when forwarded from the plurality of RFID tags; and
  (iii) using collaborative multi-lateration for processing location indicative parameters in relation to the known positions of the fixed or static RFID tags and the identification of the RFID tags forwarding the data, as well as the identification of the portable and fixed or static RFID tags originally transmitting signals, for determining at least relative positions of the entities at the site.

3. The method of claim 1, wherein one type of entities with which the portable RFID tags are associated are personnel employed at the site, further comprising the step of physically coupling the portable RFID tag to an object that is carried by a person at least while the person is working at the site.

4. The method of claim 3, further comprising the step of determining at least a specific portion of the site where a person carrying the object is located by determining the relative location of the portable RFID tag coupled to the object.

5. The method of claim 1, wherein the types of entities with which the portable RFID tags are associated include vehicles at the site, and keys that are used with the vehicles, further comprising the step of accessing a database storing information identifying each of the vehicles and relating an identification of each of the vehicles to a specific key used with the vehicle, at least the relative location of each of the vehicles and of each of the keys on the site being determined by the processor based upon the relative position of the portable RFID tags that are physically coupled to the vehicles and the keys.

6. The method of claim 5, wherein the types of entities with which the portable RFID tags are associated further include personnel employed at the site who carry objects coupled to the portable RFID tags, further comprising at least one of the steps of determining which of the personnel is carrying a specific one of the keys associated with one of the portable RFID tags; and, determining in which vehicle one of the personnel is disposed.

7. The method of claim 1, further comprising the step of enabling a user to enter a query to where a specific one or more of the entities is located at the site, the processor responding by indicating at least the relative location of the specific one or more entities at the site.

8. The method of claim 1, further comprising the step of using the data forwarded to the processor to determine when any entity is leaving or entering the site and to determine if a plurality of the entities is leaving or entering the site together.

9. The method of claim 1, further comprising the step of providing a power supply for recharging a battery included in each RFID tag, when the RFID tag is electrically coupled to the power supply, at times when the entity with which the RFID tag is associated is not moving about the site and is coupled to the power supply.

10. The method of claim 9, further comprising the step of identifying each RFID tag that is electrically coupled to the power supply so that a current location of said RFID tag at the power supply can be provided to the processor.

11. The method of claim 10, further comprising the step of suppressing communications by each RFID tag that is electrically coupled to the power supply for recharging the battery included in the RFID tag, to reduce communication traffic on the mesh network.

12. The method of claim 1, wherein at least one of the fixed or static RFID tags is designated as a controller node and is higher in a relative hierarchy than others of the fixed or static RFID tags so that it manages communications between the other fixed or static RFID tags and the portable RFID tags that are in a designated portion of the site.

13. The method of claim 12, wherein the at least one of the fixed or static RFID tags designated as a controller node is coupled in communication with the processor for conveying the data received for the designated portion of the site to the processor.

14. The method of claim 1, further comprising the step of preparing a report based upon information related to movement of the plurality of entities at the site, for access by a user.

15. The method of claim 14, wherein the step of preparing the report comprises the step of preparing a report indicating at least one of:
  (a) times at which an entity left the site and returned;
  (b) time interval during which an entity has not moved;
  (c) theft of an entity from the site;
  (d) time interval in which a vehicle has been disposed at a specific portion of the site;
  (e) removal of an entity from the site without using another entity that has been checked out of a central storage by an authorized person;
  (f) loss of an entity on the site;
  (g) removal of the RFID tag from the entity with which it is associated; and
  (h) a charge condition of batteries used to supply power to the RFID tags.

16. The method of claim 1, further comprising the steps of:
  (a) determining that a specific entity has been removed from the site that should not have been removed, based upon the data forwarded to the processor; and
  (b) in response to determining that the specific entity has been removed from the site, carrying out a predefined further step to enable the entity to be returned to the site.

17. The method of claim 16, wherein a person has inadvertently removed the specific entity from the site, and wherein the predefined further step comprises the step of automatically communicating with the person to request that the specific entity be returned to the site.

18. The method of claim 1, wherein the location indicative parameter comprises a parameter selected from the group consisting of:
  (a) a received signal strength of the signal transmitted by a RFID tag, as received by another RFID tag;
  (b) a time of flight of a signal transmitted by a RFID tag, as measured by another RFID tag that is receiving the signal; and
  (c) an angle of arrive of a signal transmitted by a RFID tag, as measured by another RFID tag that is receiving the signal.

19. A system for tracking entities, to determine at least a relative location of the entities at a site, comprising:
  (a) a mesh network comprising a plurality of radio frequency identification (RFID) tags, including at least one fixed RFID tag or at least one static RFID tag disposed at a predefined location at the site, and a plurality of portable RFID tags, each portable RFID tag being associated with a different one of the entities that can move about at the site and physically coupled or attached to the entity with which it is associated, the static RFID tag comprising a portable RFID tag that has not moved from a known location, each of the RFID tags being controlled so as to transmit a signal that includes an identification of the RFID tag transmitting the signal, the signal being received by any other of the plurality of RFID tags that is in range, each RFID tag that receives the signal determining a location indicative parameter for the signal and storing the location indicative parameter in connection with the identification of the RFID tag transmitting the signal; and (b) a processor that is configured to carry out a plurality of functions, including:
  (i) repetitively causing each RFID tag that is associated with one of the entities to transmit the signal;
  (ii) receiving data comprising the location indicative parameter and identification of the RFID tag for each of the signals that was received by an RFID tag, when forwarded from the plurality of RFID tags; and
  (iii) using collaborative multi-lateration for processing location indicative parameters in relation to the known positions of the fixed or static RFID tags and the identification of the RFID tags forwarding the data, as well as the identification of the portable and fixed or static RFID tags originally transmitting signals, for determining at least relative positions of the entities at the site.

20. The system of claim 19, wherein an anti-tamper switch is included on at least some of the portable RFID tags to detect if an RFID tag has been removed from the entity with which it is associated, removal of the RFID tag from said entity being sensed by the anti-tamper switch, causing the RFID tag to include an indication that tampering has occurred when the signal is next transmitted by the RFID tag.

21. The system of claim 19, wherein at least some of the portable RFID tags are coupled to objects that are carried by personnel who are employed at the site, so that the processor is able to determine that a person carrying an object associated with a specific portable RFID tag is currently disposed in a specific portion of the site.

22. The system of claim 19, wherein at least some of the portable RFID tags are associated with vehicles at the site, and with keys that are used with the vehicles, the processor accessing a database that stores information identifying each of the vehicles and relating an identification of each of the vehicles to a corresponding specific key used with the vehicle, the processor determining at least the relative location of each of the vehicles and each of the keys on the site based upon the relative position of the portable RFID tags that are physically coupled to the vehicles and the keys.

23. The system of claim 22, wherein at least some of the portable RFID tags are coupled to objects that are carried by personnel who are employed at the site, wherein the processor uses the relative locations of the entities to determine at least one of:
  (a) which of the personnel is carrying a specific key; and
  (b) if a specific one of the personnel is disposed in a vehicle.

24. The system of claim 19, further comprising a terminal coupled to the processor, the terminal including a human input interface that enables a user to selectively initiate a query to determine where a specific one or more of the entities is located at the site, the processor producing a response to the query that indicates at least the relative position of the specific one or more of the entities at the site.

25. The system of claim 19, wherein the processor evaluates the data to detect when any entity is leaving or entering the site, and to determine if a plurality of the entities is leaving or entering the site together at that time.

26. The system of claim 19, further comprising a power supply for recharging a battery included in each RFID tag, when the RFID tag is electrically coupled to the power supply, at times when the entity with which the RFID tag is associated is not moving about the site and is coupled to the power supply.

27. The system of claim 26, wherein the power supply includes an RFID tag that transmits an identification of each other RFID tag that is electrically coupled to the power supply, to the processor, so that a current location of said each other RFID tag at the power supply is maintained by the processor.

28. The system of claim 27, wherein the RFID tags that are electrically coupled to the power supply are controlled to suppress transmissions until being disconnected from the power supply and moved, to reduce communication traffic on the mesh network.

29. The system of claim 19, wherein at least one of the fixed or static RFID tags is designated as a controller node and is higher in a relative hierarchy than others of the fixed or static RFID tags so that it controls the other fixed and static RFID tags and the portable RFID tags that are disposed in a designated portion of the site.

30. The system of claim 29, wherein the at least one of the fixed or static RFID tags designated as a controller node is coupled in communication with the processor for conveying the data received for the designated portion of the site to the processor.

31. The system of claim 19, wherein the processor is configured to prepare a report based upon information related to movement of the plurality of entities at the site, for access by a user, the report indicating at least one of:
  (a) times at which an entity left the site and returned;
  (b) time interval during which an entity has not moved;
  (c) theft of an entity from the site;
  (d) time interval in which a vehicle has been disposed at a specific portion of the site;
  (e) removal of an entity from the site without using another entity that has been checked out of a central storage by an authorized person;
  (f) loss of an entity on the site;
  (g) removal of the RFID tag from the entity with which it is associated; and
  (h) a charge condition of batteries used to supply power to the RFID tags.

32. The system of claim 17, wherein the processor is further configured to carry out the following functions:
  (a) determining that a specific entity has been removed from the site that should not have been removed, based upon the data forwarded to the processor; and
  (b) in response to determining that the specific entity has been removed from the site, carrying out a predefined function that is intended to result in the entity being returned to the site.

33. The system of claim 32, wherein a person has inadvertently removed the specific entity from the site, and in response to detecting the removal, the processor automatically communicates with the person to request that the specific entity be returned to the site.

34. The system of claim 19, wherein the location indicative parameter comprises a parameter selected from the group consisting of:
  (a) a received signal strength of the signal transmitted by a RFID tag, as received by another RFID tag;
  (b) a time of flight of a signal transmitted by a RFID tag, as measured by another RFID tag that is receiving the signal; and (c) an angle of arrive of a signal transmitted by a RFID tag, as measured by another RFID tag that is receiving the signal.

\* \* \* \* \*